US011614946B2

(12) United States Patent
Knowles

(10) Patent No.: US 11,614,946 B2
(45) Date of Patent: Mar. 28, 2023

(54) NETWORKED COMPUTER

(71) Applicant: Graphcore Limited, Bristol (GB)

(72) Inventor: Simon Knowles, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 320 days.

(21) Appl. No.: 16/831,564

(22) Filed: Mar. 26, 2020

(65) Prior Publication Data
US 2020/0310819 A1 Oct. 1, 2020

(30) Foreign Application Priority Data

Mar. 27, 2019 (GB) .................................. 1904263

(51) Int. Cl.
*H04L 12/54* (2022.01)
*G06F 9/38* (2018.01)
*G06F 9/54* (2006.01)
*G06N 20/10* (2019.01)
*G06N 3/08* (2023.01)
*H04L 12/70* (2013.01)

(52) U.S. Cl.
CPC .............. *G06F 9/3885* (2013.01); *G06F 9/54* (2013.01); *G06N 3/08* (2013.01); *G06N 20/10* (2019.01); *H04L 12/5601* (2013.01); *H04L 2012/5612* (2013.01)

(58) Field of Classification Search
CPC ......... G06F 9/3885; G06F 9/54; G06N 20/10; G06N 3/08
See application file for complete search history.

(56) References Cited

U.S. PATENT DOCUMENTS

| 7,656,881 | B2* | 2/2010 | Hall | H04L 12/43 370/395.32 |
| 9,143,338 | B2* | 9/2015 | Fricker | H04L 45/06 |
| 9,294,551 | B1* | 3/2016 | Froese | G06F 9/524 |
| 2016/0098021 | A1* | 4/2016 | Zornio | G05B 13/0265 700/47 |
| 2018/0240039 | A1* | 8/2018 | Mclaren | G06N 20/00 |

(Continued)

OTHER PUBLICATIONS

International Search Report dated Jun. 9, 2020 for Patent Application No. PCT/EP2020/058619. 14 pages.

(Continued)

*Primary Examiner* — Rasheed Gidado
(74) *Attorney, Agent, or Firm* — Haynes and Boone, LLP

(57) ABSTRACT

A computer comprising a plurality of processing nodes is provided. Each processing node has at least one processor configured to process input data to generate an array of data items. The processing nodes are arranged in cliques in which each processing node of a clique is connected to each other processing node in the clique by first and second clique links. The cliques are inter-connected in rings such that each processing node is a member of a single clique and a single ring. The processing nodes of all cliques are configured to exchange in each exchange step of a machine learning collective via the respective first and second clique links at least two data items with the other processing node(s) in its clique, and all processing nodes are configured to reduce each received data item with the data item in the corresponding position in the array on that processing node.

16 Claims, 21 Drawing Sheets

(56) References Cited

U.S. PATENT DOCUMENTS

2018/0322387 A1 11/2018 Sridharan
2019/0045003 A1* 2/2019 Archer ............... H04L 67/2828

OTHER PUBLICATIONS

Combined Search and Examination Report dated Jun. 17, 2020 for Patent Application No. GB2004422.8. 10 pages.
Chen Juan, Reducing Static Energy in Supercomputer Interconnection Networks Using Topology-Aware Partitioning, IEEE Transactions on Computers, IEEE, USA, vol. 65. No. 8, Aug. 1, 2016. pp. 2588-2602.
Conner S, Link Shutdown Opportunities During Collective Communications in 3-D Torus Nets, Parallel and Distributed Processing Symposium, 2007. IPDPS 2007. IEEE International, IEEE, PI, Mar. 1, 2007, pp. 1-8.
Totoni Ehsan, Toward Runtime Power Management of Exascale Networks by on/off Control of Links, 2013 IEEE International Symposium on Parallel & Distributed Processing Workshops and PHD Forum, IEEE, May 20, 2013, pp. 915-922t.
International Search Report dated Jun. 18, 2020 for Application No. PCT/EP2020/058618. 17 pages.
Combined Search and Examination Report dated Jun. 22, 2020 for Patent Application No. GB2004424.4. 12 pages.
Examination Report dated Jun. 21, 2021 for Patent Application No. GB2004424.4. 3 pages.
Camera et al., "Twisted Torus Topologies for Enhanced Interconnection Networks", IEEE Transactions on Parallel and Distributed Systems, vol. 21, No. 12, pp. 1765-1778, Dec. 2010.
Office Action dated May 10, 2022 for U.S. Appl. No. 16/831,572.

* cited by examiner

NETWORKED COMPUTER

CROSS-REFERENCE TO RELATED APPLICATION

The present application claims priority to United Kingdom Patent Application No. 1904263.9, filed on Mar. 27, 2019, which is hereby incorporated by reference in its entirety.

FIELD

The present disclosure relates to the exchange of data between processing nodes connected in a computer particularly but not exclusively for optimising data exchange in machine learning/artificial intelligence applications.

BACKGROUND

Collectives are routines which are commonly used when processing data in a computer. They are routines which enable data to be shared and processed across multiple different processes, which may be running on the same processing node or different processing nodes. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collective are termed "Reduce" and "Allreduce". A Reduce operation enables a result of a compute function acting on multiple data values from different source processes to be provided at a single receiving process. Note that a receiving process may be one of the source processes, and that there may be multiple receiving processes. The Allreduce collective reduces the data values from multiple source processes and distributes the results to all the source processes, (which are acting as receiving processes for the reduced result). According to the MPI Standard, the Allreduce collective may be implemented by reducing the data values from all source processes in a reduce collective (e.g. at one of the processes) and then broadcasting the result to each source process.

FIG. 1 is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 1, but it will readily be appreciated that any number of processing units could be utilised. Each processing unit 110a, b, c receives batches of training data from the training data source 100. Each processing unit 110a, b, c holds a set of parameters 112a, 112b, 112c which define the model. An incoming batch of training data is processed with a current set of parameters in a calculation function 114 and the results of the calculation function are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112a, b, c and the delta weights are labelled 116a, b, c in FIG. 1. It will be appreciated that in practice the weights and delta weights are stored in suitable stores accessible by the processing unit. If the weights and delta weights can be held in local memory, this renders the training process much more efficient.

The aim with the architecture of FIG. 1 is not to train three separate models but to train a single model in a distributed manner Therefore, the purpose is to have the model parameters (or weights) converged to a single common set in each processing unit. It is evident that starting from any particular set of weights, and assuming that the batch of training data received at each processing unit is not identical, then there will be a variation in the delta weights which are produced by each calculation function in each processing unit. What is needed therefore is a way to combine and distribute the delta weights across the processing units after each iteration of batched training data. This is shown diagrammatically in FIG. 1 where a combinational function 118 receives the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118, and the new weights 118a, 118b, 118c are stored back into local memory. Then, the next batch of training data is supplied to each processing unit and the process repeats multiple times. It is evident that if the starting weights of the processing units are the same, then after each iteration they will be reset again to the same, new values. It can readily be seen that the above is an example of where the Allreduce function is particularly useful. The delta weights are supplied to the combinatorial function 118 where they are reduced, and they are then supplied back to each of the processing units in their reduced form, where they can be combined with the original weights.

FIG. 1A is a schematic diagram to illustrate how an Allreduce collective might be implemented in a line connected topology of six processing nodes $N_0 \ldots N_5$. These processing nodes may correspond to the processing units of FIG. 1 in which the combinational function is distributed between the nodes so that there is no longer a combining node as in FIG. 1. The processing nodes are shown connected in a line configuration where each processing node is connected to its neighbour by a "forwards" links $L_F$ and a "backwards" link $L_B$. As shown in the diagram, and as the directional phrases imply, the forward links connect processing nodes from the left to right in FIG. 1A, and the backwards links connect processing nodes from the right to left in FIG. 1A. Each processing node has a processing capability designated 200, and a storage capability designated 202. The processing capability and storage capability can be implemented in any of a very large number of ways. In one particular manifestation, the processing node may comprise multiple tiles, each individual tile having its own processing capability and associated memory capability. Each processing node also has one or more link interface which enables it to be connected to its neighbouring node via the links $L_F/L_B$.

To understand the implementation of the Allreduce collective, assume that the first node N0 has generated a "partial" vector labelled Δ0. The "partial" may be a data structure comprising an array, such as vector or tensor, of delta weights. This is stored in the storage capability 202 ready to be exchanged in an Allreduce collective. In reality there may be a vector of partials, with each partial corresponding to a computation on the processing node. In a simple "streaming" line Allreduce algorithm, the forward links are used for "reduce" and the backward links are used for "broadcast". The algorithm starts with the processing node at one end (the left hand node in FIG. 1A) sending its partial Δ0 to its adjacent node $N_1$. At this node, the incoming partial (Δ0 in this case) is reduced with the corresponding partial which was generated by the computing capability 200 at the processing node $N_1$, Δ1. The result of this reduction (shown as an ADD function in FIG. 1A) is then sent from processing node $N_1$ to the next connected node $N_2$. As mentioned further herein, the ADD function could be replaced by any combinatorial function which could be used to reduce the partials. The process occurs at each processing node, until at the final processing node, denoted $N_5$ in FIG. 1A, the reduction of the partials is complete. At this point, the reduction (summation Δ) is sent back to each processing node via the backward links $L_B$. It is received at each node, stored at that node in the memory capability and then also transmitted to the next node. In this way, each processing node ends up with the reduced result.

FIG. 1B shows a timing diagram of the reduce and broadcast phases. Note that a processing node cannot sent a reduced result to the next node until it has received the incoming data from the previous node. Thus, there is an inherent latency marked Δ for each outgoing transmission on the forward links.

Furthermore, the backward links are not utilised for broadcast until the fully reduced result has been obtained at the end node. However, if the partials vectors are large, due to the pipelined effect , the lead data item of the reduced result, being the reduction of the first partials from the partial vector at each node, will return to the starting node well before that starting node has finished sending the data items of its partial , so there may be substantial overlap of activity on all forward and backward links.

In a modification to this algorithm, which represents a small improvement, processing nodes at each end of the line can start to transmit their partials towards a central node, with the reduction being completed at the central nodes. In that case, the result is broadcast back to the end nodes. Note that in this scenario, there would be a reversal in the direction of movement, for example between nodes $N_2$ and $N_3$, and $N_3$ and $N_4$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. See FIG. 1C. That is, each partial is split into two parts. A first half ΔA is reduced on the forward links (as in FIG. 1A), and broadcast on the connecting leg between $N_5$ and $N_0$. The other half of the vector ΔB is reduced on the backward links, and then broadcast on the connecting ring of the backward links such that each node receives a copy of the Allreduce result.

FIG. 1D illustrates the corresponding timing diagram for the forward and backward links.

The principles of the one-dimensional ring is shown in FIGS. 1C and 1D can be extended to rings in two dimensions such as in a toroid connected computer.

Using rings in two dimensions, an alternative approach is to implement Allreduce using a reduce-scatter collective followed by an Allgather collective. A paper authored by Jain and Sabharwal entitled "Optimal Bucket Algorithms for large MPI collectives on torus interconnects" (ICS' 10, June 2-4, Tsukuba) presents bucket based algorithms for Allgather, reduce-scatter and Allreduce collectives assuming bi-directional links between processing nodes in a torus interconnected processor. This approach operates on the basis that there are multiple data values (fragments) to be handled in each step. In the reduce-scatter collective, each process starts with an initial partial vector. It is assumed that a reference here to a process is to a process carried out on a processing node. A partial vector can be divided into multiple elements or fragments. The corresponding elements of all processes are reduced and these reduced elements are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

As discussed in Jain's paper, torus interconnects are attractive interconnection architectures for distributed memory supercomputers. In the above discussion, collectives have been explained in the context of communication between processes. In a distributed super computer, processing nodes are interconnected, and each processing node may be responsible for one or more process in the context of collectives. A torus interconnect is a type of mesh interconnect with processing nodes arranged in an array of N dimensions, with each node connected to its nearest neighbours, and corresponding nodes on opposite edges of the array also connected. Bi-directional communication links exist between interconnected processing nodes.

The algorithms for implementing collectives which are discussed in the above-referenced paper authored by Jain and Sabharwal are applied on torus connected architectures. This allows the collectives to process different fragments of the partial vectors in rings in different dimensions at the same time, making the process bandwidth efficient. Indeed, Jain and Sabthawal present their techniques as optimal for an asymmetric torus, and it has been accepted in the field that this is the case.

An objective of the present disclosure is to present an improved topology and method for implementing an Allreduce function, particularly but not exclusively for use in processing functions in machine learning.

SUMMARY

An aspect of the invention provides a computer comprising a plurality of processing nodes, each processing node having at least one processor configured to process input data to generate output data in the form of an array of data items; the plurality of processing nodes arranged in cliques in which each processing node of a clique is connected to each other processing node in the clique by first and second clique links, the cliques being inter-connected in rings such that each processing node is a member of a single clique and a single ring, the processing nodes being configured to exchange data items in respective exchange steps of a machine learning collective, wherein the processing nodes of all cliques are configured to exchange in each exchange step via the respective first and second clique links at least two data items with the other processing node(s) in its clique, and all processing nodes are configured to reduce each received data item with the data item in the corresponding position in the array on that processing node.

The processing nodes may be configured by programming by machine readable computer instructions executed by a processor.

The machine learning collective can be an Allreduce collective wherein each processing node is configured to exchange data items in exchange steps of an Allgather phase, following a reduce scatter phase of the Allreduce collective, wherein in each step of the Allgather phase reduced data items are exchanged between processing nodes in a clique.

The processing nodes can be configured so that each processing node transmits data items in a forwards direction to its adjacent processing node in the ring in at least some of the exchange steps in the reduce-scatter phase.

The processing nodes may be configured to transmit data items to their forwards adjacent processing node in the ring for all exchange steps of the reduce scatter phase apart from a first step, in which no data items are transmitted between processing nodes connected in a ring.

In at least some exchange steps of the reduce-scatter phase data items may be transmitted from each processing node to its adjacent backwards processing node in the ring, wherein the transmission in each of the forwards and backwards direction from each processing node is carried out on the same bi-directional link. Each processing node may comprise memory configured to store an array of data items (such as a vector or tensor) ready to be exchanged in the reduce scatter phase, wherein each data item is respectively positioned in the array with corresponding data items being respectively positioned at corresponding locations in the arrays of other processing nodes. The array may be a partial vector "partial" (a vector of partial results) in the reduce-scatter phase or a "result" (a vector of fully reduced partials) in the Allgather phase.

The array at each processing node may comprises two sub arrays, wherein the processing nodes are inter-connected by bi-directional links, wherein in each exchange step of the reduce scatter phase, all processing nodes exchange with the other processing node(s) of their clique, two data items from one sub array and two further data items from the other sub array wherein the two data items and the further two data items are exchanged over the same bi-directional link in opposite directions.

Each array may be at least part of a vector of partial deltas, each partial delta representing an adjustment to a value stored at each processing node.

Each processing node may be configured to generate the vector of partial deltas in a compute step. In one embodiment, each processing node may be configured to generate the vector of partial deltas by carrying out a compute function on a set of values and a batch of incoming deltas, the partial deltas being the output of the compute function.

Each processing node may be configured to divide the vector into two sub arrays for separate exchange and reduction in the reduce-scatter phase.

The computer described herein in some embodiments is configured to implement a machine learning model wherein the incoming batch data is training data, and the values are weights of the machine learning model.

Another aspect of the invention provides a method of operating a computer comprising a plurality of processing nodes, each processing node having at least one processor configured to process input data to generate output data in the form of an array of data items, the plurality of processing nodes arranged in cliques in which each processing node of a cliques, the cliques being interconnected in rings such that each processing node is a member of a single clique and a single ring, the method comprising exchanging data items in respective exchange steps of a first phase of a machine learning collective, wherein in each exchange step the processing nodes of all cliques exchange via the respective first and second clique links at least two data items with the other processing nodes in its clique, and all processing nodes reduce each received data item with the data item in the corresponding position in the array on that processing node.

While the topologies and configurations described herein are particularly effective for the efficient implementation of Allreduce, they may also be advantageously used for other machine learning collectives and other types of parallel programs.

BRIEF DESCRIPTION OF THE DRAWINGS

For a better understanding of the present invention to show how the same may be carried into effect, reference will now be made by way of example to the accompanying drawings.

DETAILED DESCRIPTION

Aspects of the present invention have been developed in the context of a multi-tile processor which is designed to act as an accelerator for machine learning workloads. The accelerator comprises a plurality of interconnected processing nodes. Each processing node may be a single multi-tile chip, a package of multiple chips, or a rack of multiple packages. The aim herein is to devise a machine which is highly efficient at deterministic (repeatable) computation.

Processing nodes are interconnected in a manner which enable collectives, especially broadcast and Allreduce, to be efficiently implemented.

One particular application is to update models when training a neural network using distributed processing. In this context, distributed processing utilises multiple processing nodes which are in different physical entities, such as chips or packages or racks. That is the transmission of data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over provisioning are normal. Excess bandwidth may be provisioned in a HPC network with the aim of reducing latency rather than to provide bandwidth. Over provisioning of active communication links waste power which could contribute to compute performance. The most common type of link used in computing today draws power when it is active, whether or not it is being used to transmit data.

The present inventor has developed a machine topology which is particularly adapted to MI workloads, and addresses the following attributes of MI workloads.

In MI workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks. Note that the communication links could be between chips on a printed circuit board, or between chips on different printed circuit boards, for example using interfaces with chip to chip external ports.

It is possible to compile the workloads such that within an individual intelligence processing unit (IPU) machine, all-to-all communication is primarily inter-chip.

Figure 2:
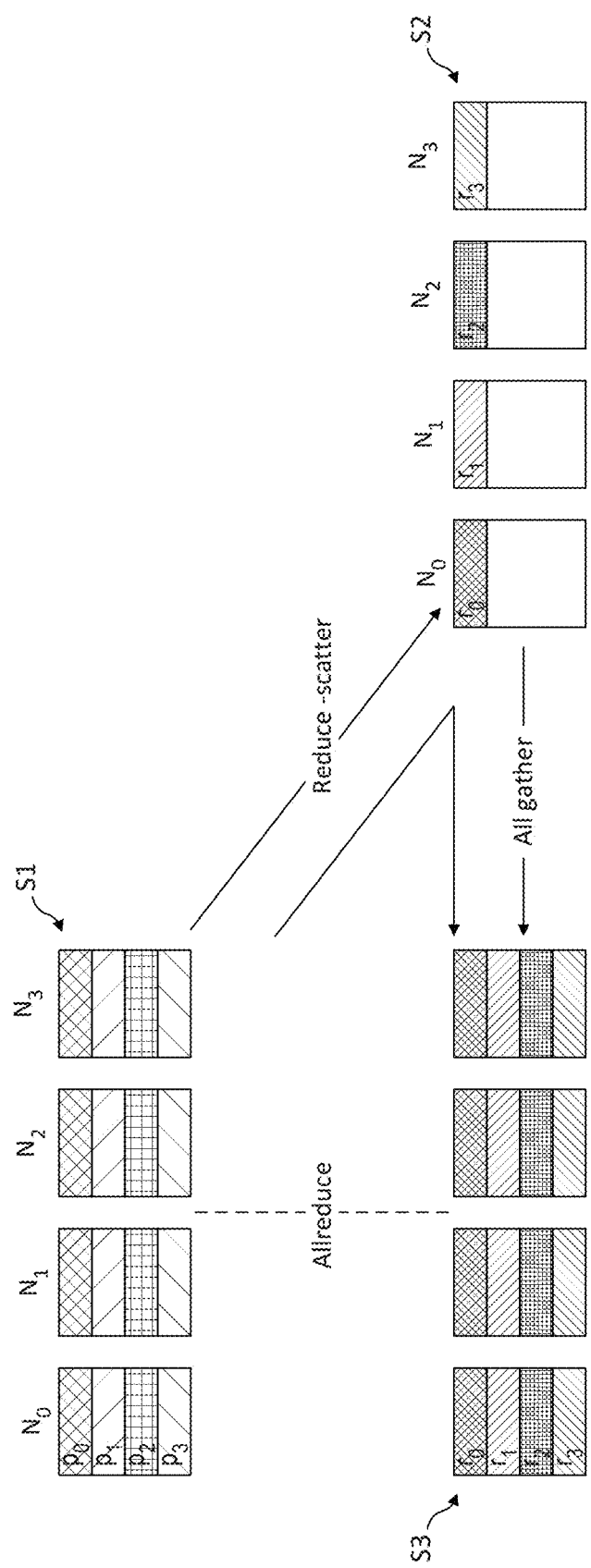
FIG. 2 is a schematic diagram illustrating implementation of an Allreduce function by a reduce-scatter step followed by Allgather step.

The Allreduce collective has been described above and is illustrated in FIG. 2. FIG. 2 shows a set (vector) of partial values or "partial" vector $P_0$, $P_1$, $P_2$, $P_3$ on each of four nodes in a starting state S1. In this context a node is a processing node in a network of processing nodes. Note that each node $N_0$, $N_1$, $N_2$, $N_3$ has four "corresponding" partials which are hatched accordingly—large diamond grid, wide downward diagonal stripe, large square grid, wide upward diagonal stripe. That is, each partial has a position in in its partial vector such that P0(n) has the same position in its vector on node n as P0 (n+1) in its vector on node n+1. The suffix (n) is used to denote the node in which the partial resides—thus P0(0) is the partial P0 on node $N_0$. In a reduce-scatter pass, corresponding partials are reduced and the reduction provided to one of the nodes. For example, partials P0(0), P0(1), P0(2), P0(3) are reduced (to $r_0$) and placed onto node $N_0$. Similarly, partials P1(0), P1(1), P1(2) and P1(3) are reduced (to $r_1$) and placed onto node $N_1$. And so forth so that in an intermediate state S2, each node has one of the reductions $r_0$, $r_1$, $r_2$ and $r_3$. As explained, the reduction may be by any combinational function f $(P_{i_0}^3)$—which could include independent operators (e.g. max) or associative operators=P1(0) *P1(1)*P1(2)*P1(3). Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. $r_0$ is the same at all nodes, where $r_i = f\{(P_i(0), P_i(1), P_i(2)$ and $P_i(3))\}$. In machine learning, the set of partial values P0, P1, P2, P3 is a vector. A vector of partials (e.g. updated weights) is produced on each pass of the model during training. The reduction $r_0$ (diamond grid), $r_1$ (downward diagonal stripe), $r_2$ (square grid), $r_3$ (upward diagonal stripe) on each node in state S3 is the full reduction vector. In the context of machine learning, each partial could be a set of updating deltas for a parameter in the model. Alternatively (in an arrangement not described further herein) it could be an updated parameter.

Figure 3:
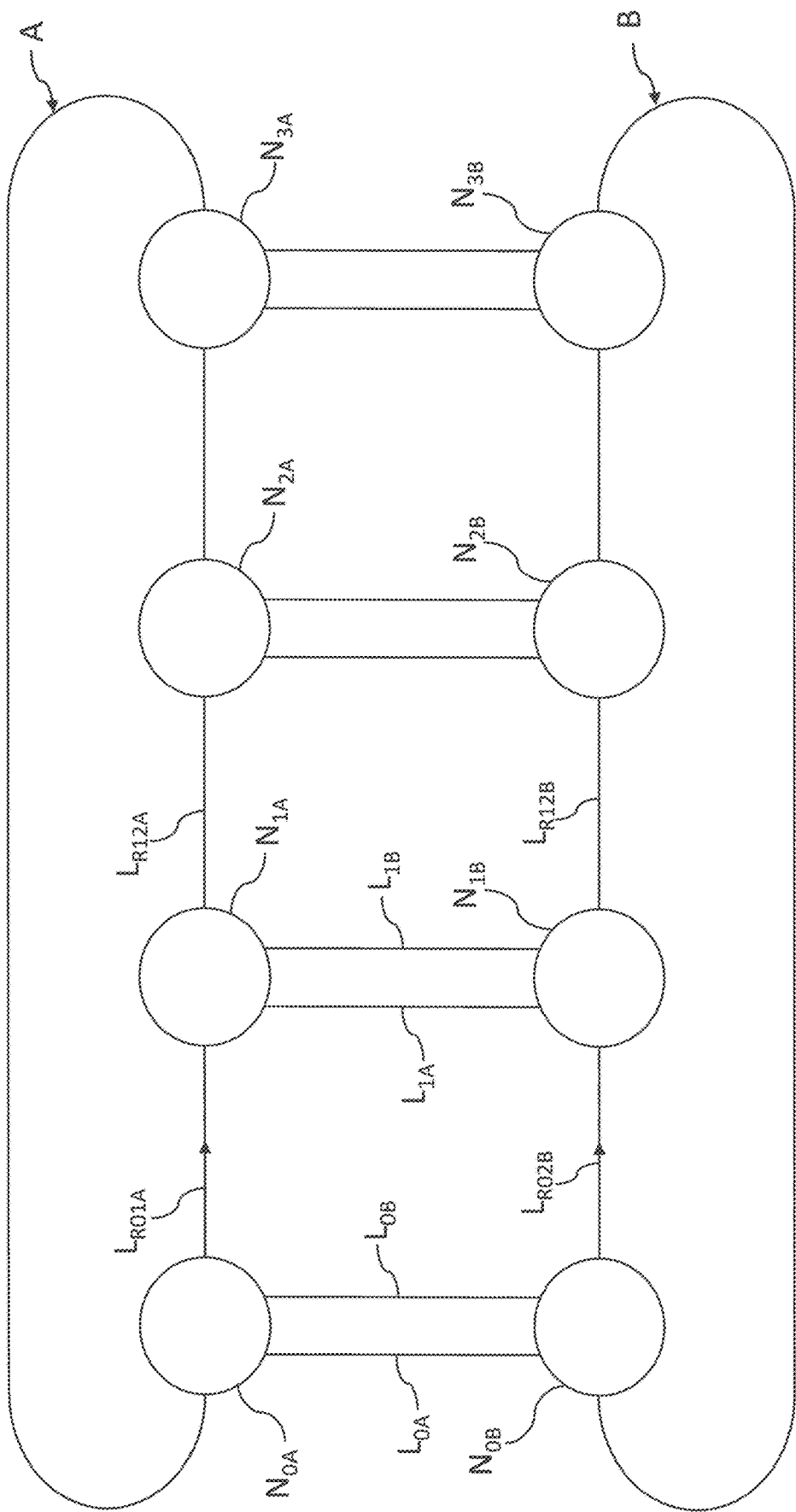
FIG. 3 is a schematic example of one embodiment of a ring of cliques.
Figure 3A:
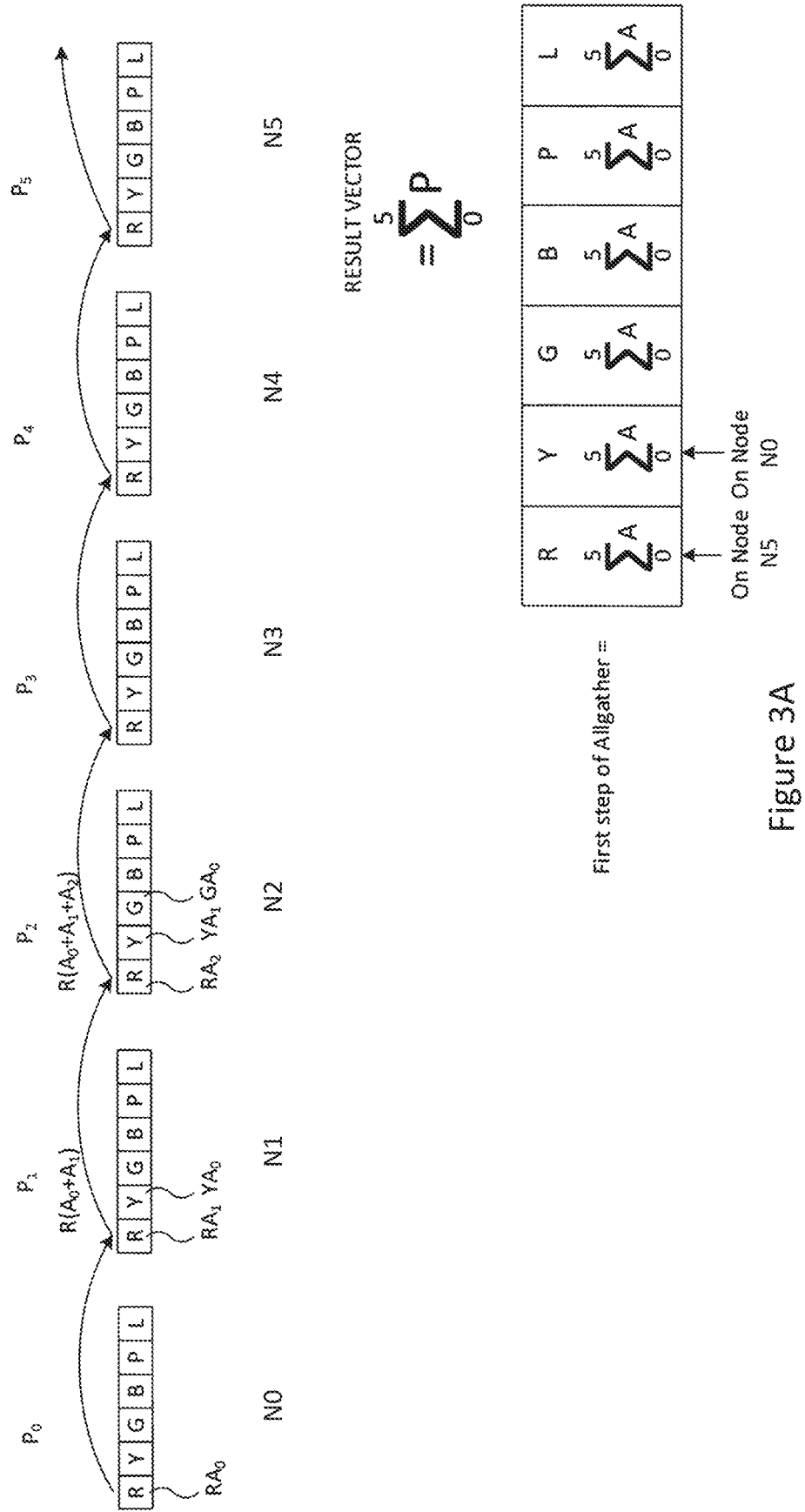
FIG. 3A and 3B illustrate a bucket based Allreduce algorithm.
Figure 3B:
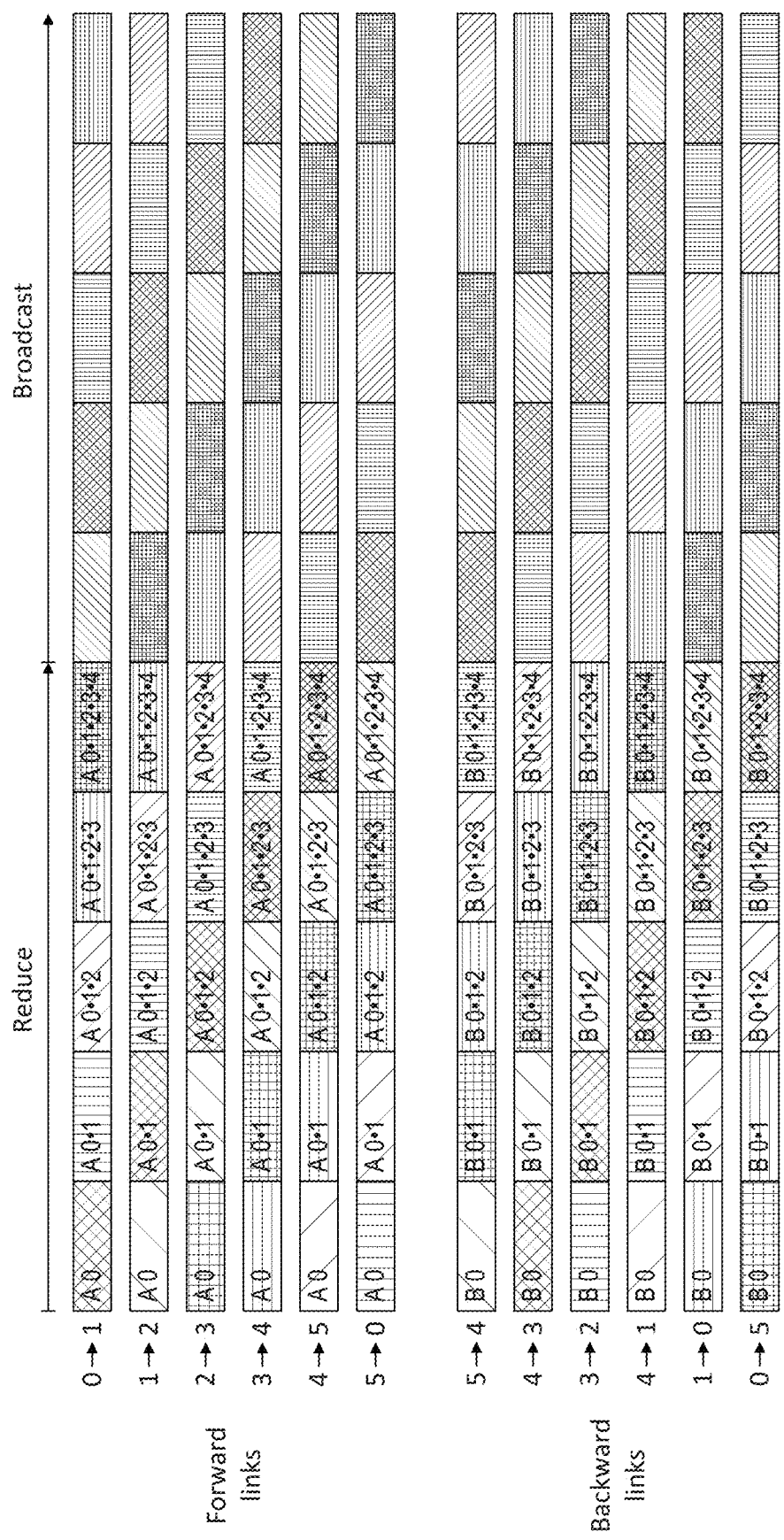

FIG. 3A and 3B illustrate a bucket based algorithm for reduce-scatter/Allgather that assumes six "virtual" ID rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each node, indicated by hatching diamond grid, upward diagonal stripe, square grid, horizontal stripe, downward diagonal stripe, vertical stripe. The letters denote corresponding fragments which are to be reduced with each other, and define the "virtual" or "logical" ring for those fragments. Looking at FIG. 3A, the "R" fragments in each of the partials P0, P1, P2, P3 and P4 are reduced into a single fragment in the result vector (R$\Sigma A_0^5$). Similarly for the Y, G, B, P and L fragments.

FIG. 3B shows a timing diagram with time on the horizontal axis indicating the data exchanges and computations in each step of the Allreduce process. In FIGS. 3A and B, the Allreduce process is accomplished by a reduce-scatter phase followed by an Allgather phase. In FIG. 3B each of the fragments are denoted by different hatching as described above.

The notation in FIGS. 3A and 3B is as follow. The partials are each denoted P0, P1, P2, P3, P4, P5. At the start of the process, each partial is stored on a respective node N0, N1, N2, N3, N4, N5. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3-N4-N0. RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 3A shows only the virtual rings on the forward links. FIG. 3B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the $A_0$ fragments of each virtual ring will simultaneously be being transmitted. That is, the link between N1 and N2 is used to transmit YA0, the link between N2 and N3 is used to transmit GA0, et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all fragments are numbered, nor are all transmissions numbered in FIG. 3A. The full set of fragments and numbers are shown in FIG. 3B. This process carries on for five steps. After five steps, there is a reduction of all fragments on each node. At the end of the fifth step, this reduction is on the last node of each corresponding ring for that fragment. For example, the R reduction is on node N5.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Implementation of the algorithm is optimal if the computation required for the reduction can be concealed behind the pipeline latency. Note that in forming suitable rings in a computer for implementation of Allreduce, a tour of the ring must visit each node in the ring only once. Therefore the natural ring formed by a line with bi-directional links (FIG. 1A) is not the most efficient ring.

There will now be described an improved topology for an interconnected network of processing nodes which permits an efficient exchange of partials and results between processing nodes to implement an Allreduce collective.

Figure 1:
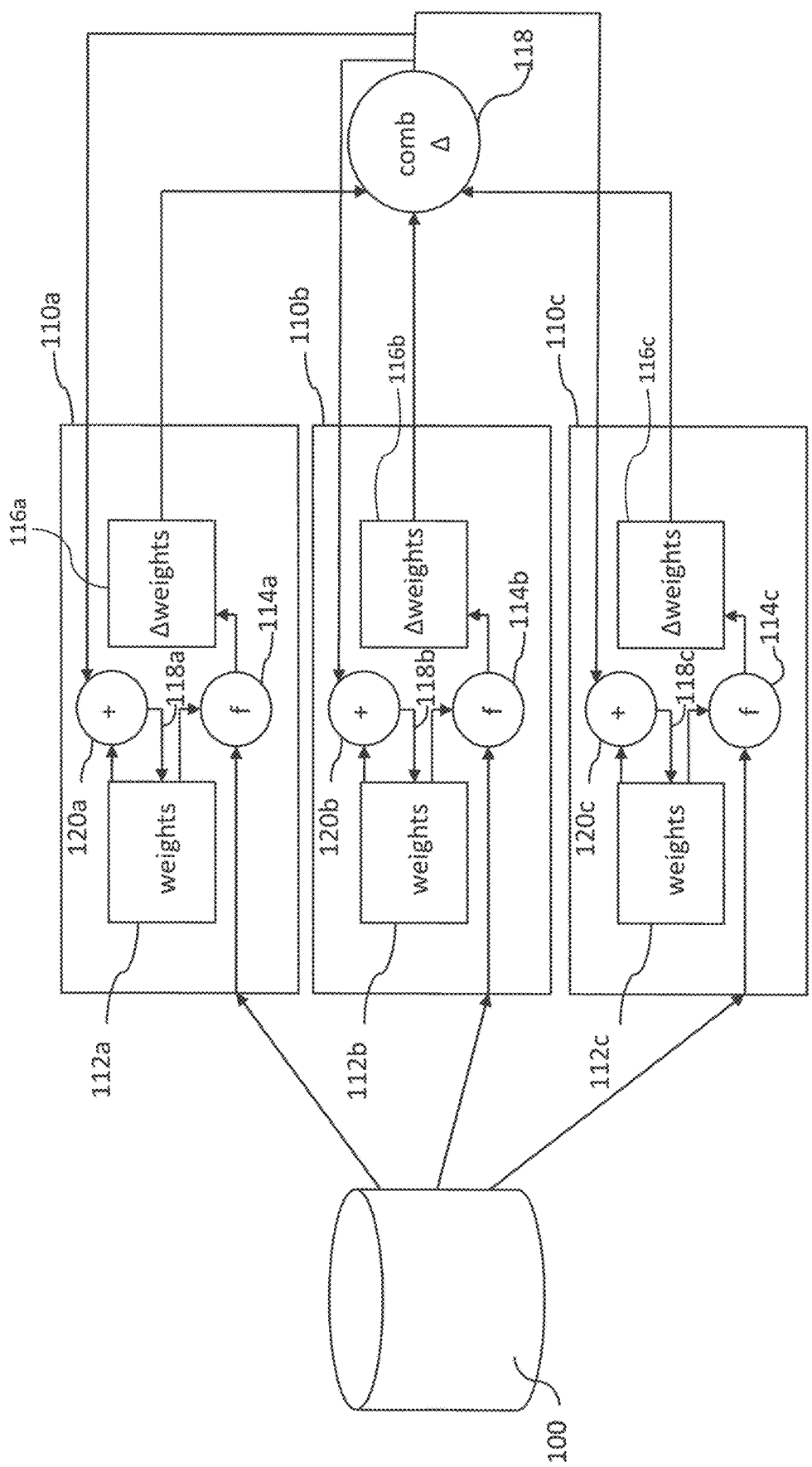
FIG. 1 is a schematic diagram illustrating distributed training in a neural net.
Figure 1A:
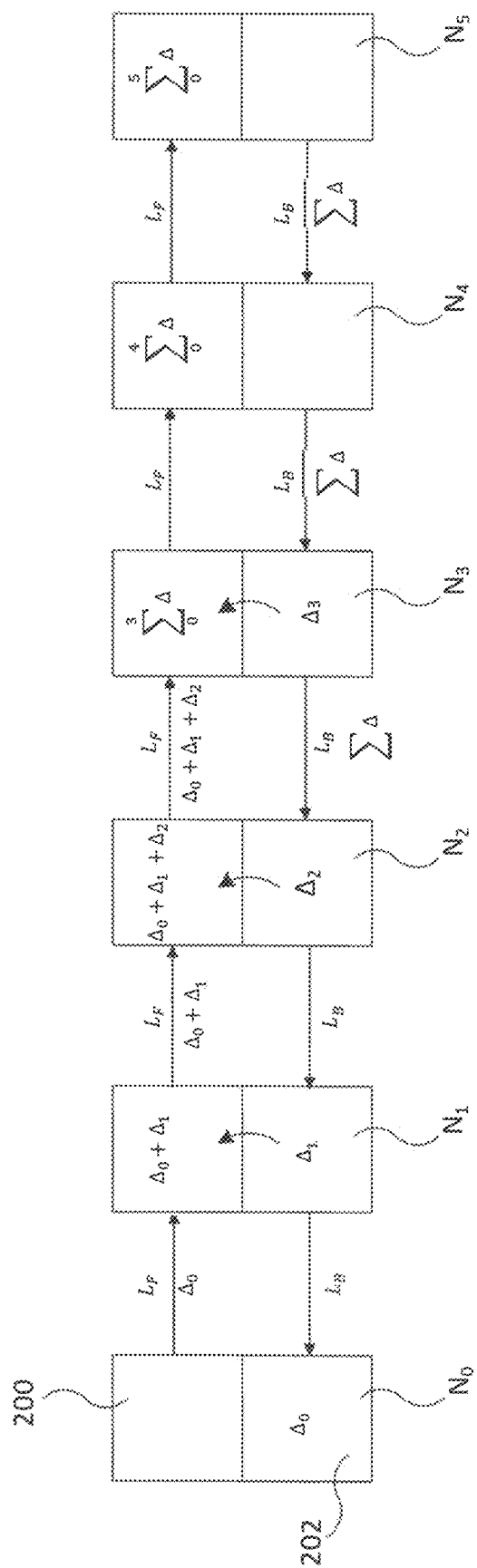
FIG. 1A is a schematic diagram showing a line of processing nodes for implementing a simple "streaming" line Allreduce algorithm.
Figure 1B:
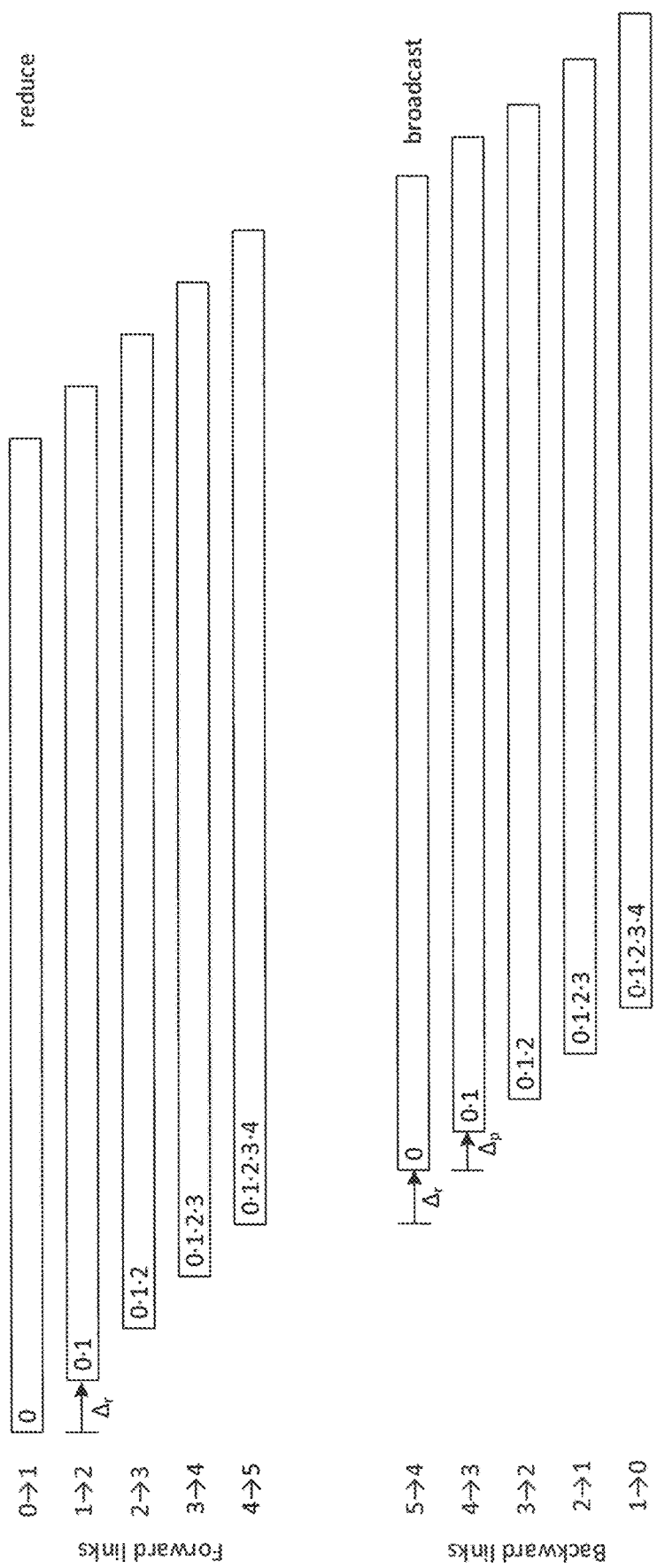
FIG. 1B is a timing diagram of a "streaming" line Allreduce algorithm.
Figure 1C:
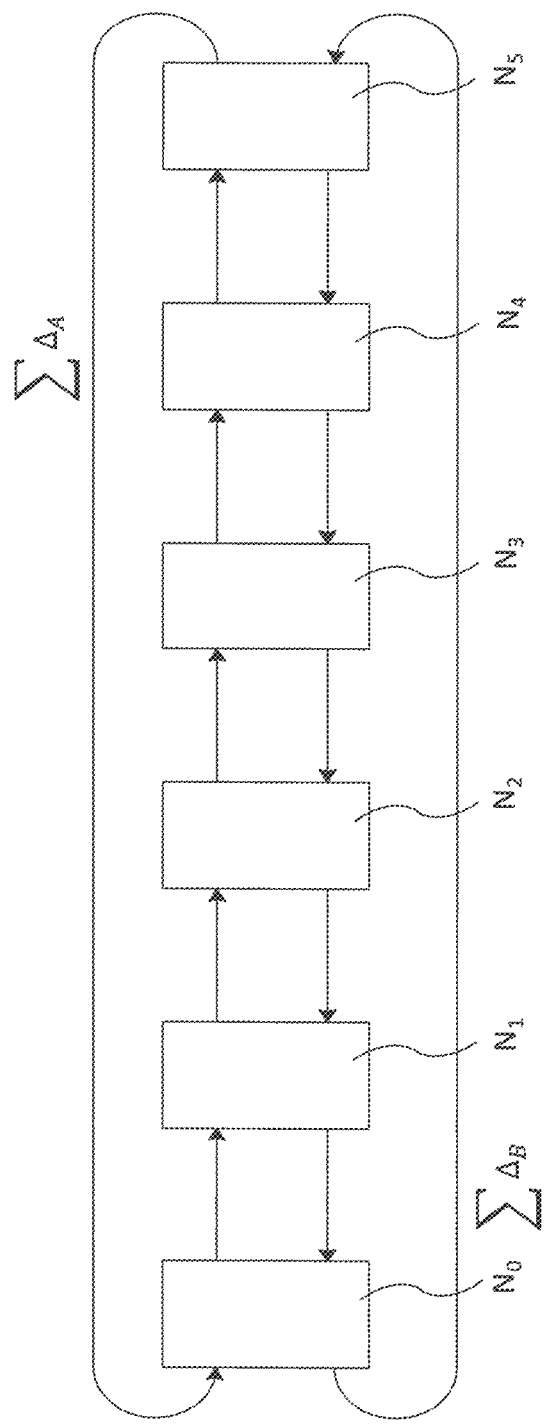
FIG. 1C is a schematic diagram of a line with the end nodes connected into a ring.
Figure 1D:
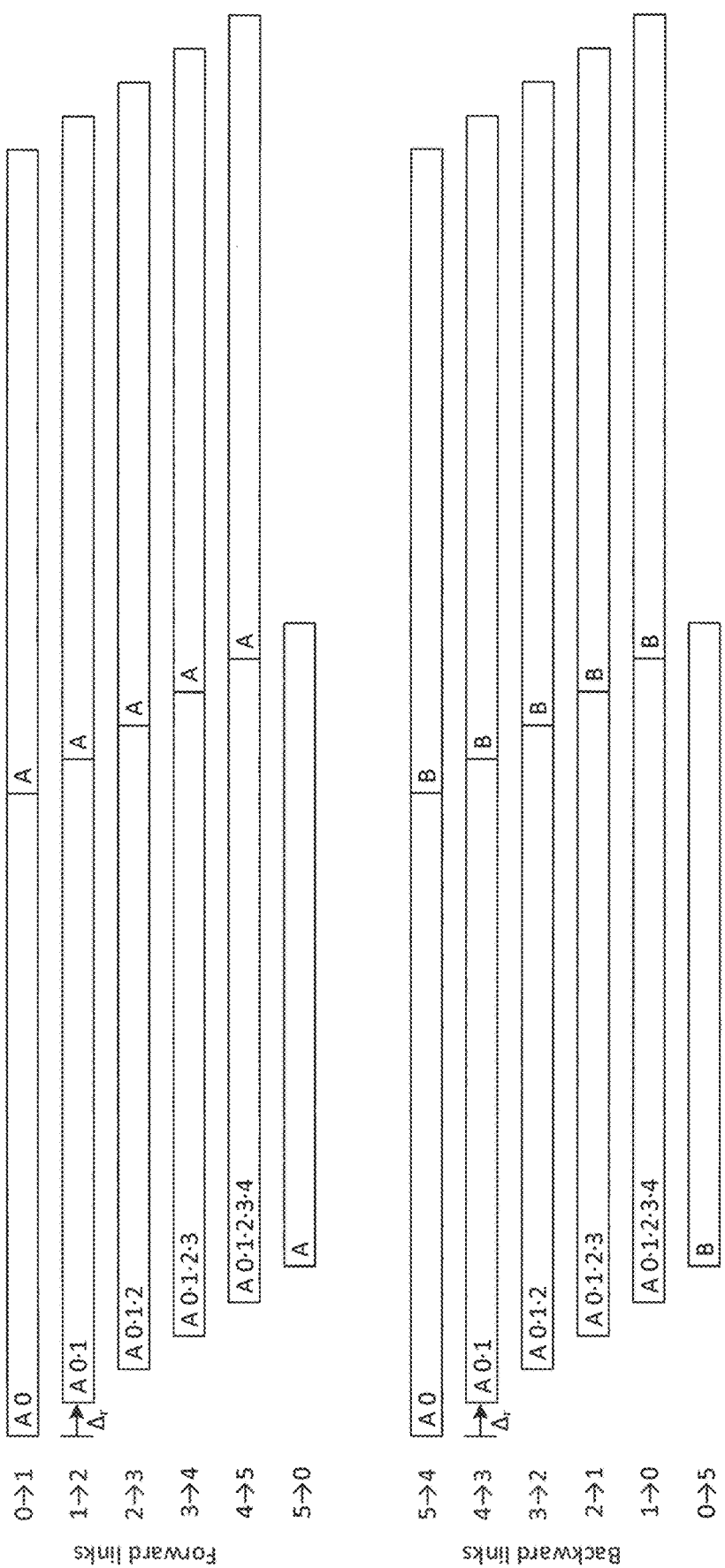
FIG. 1D is a timing diagram of a ring Allreduce algorithm.

FIG. 3 is a schematic example of one embodiment of an architecture for implementing a ring of clique message exchange protocol, in which multiple virtual rings are created. A clique comprises a set of member nodes, labelled NnA and NnB, where n denotes the clique number in the ring, N A or B denotes the ring connections of that member node. In the example of FIG. 1, there are four cliques, each having two member nodes. As will be understood, cliques could have more than two members. A property of a clique is that each member node of the clique is connected to all other member nodes of the clique, preferably by bidirectional links.

The corresponding nodes of each clique are connected in a respective ring. In this context, 'corresponding' defines the relative connections of the nodes, such that each node is a member of only one ring and only one clique. When considering the orientation of FIG. 1, the "top" nodes NnA of the respective cliques are connected in ring A, and the "bottom" nodes NnB of the respective cliques are connected in ring B. That is, each node has a bi-directional link to its neighbour nodes. N0A is connected to N1A, and also to N3A. Node N1A is connected to N0A and N2A, and N2A is connected to N1A and N3A. The ring links are each bi-directional, but are labelled in the "forwards" direction of the ring. For example, the ring link connecting nodes N0A and N1A is referred to as $L_R01A$. The suffix "$^R$" denotes that it is a ring link. The letter A denotes the ring in which the link belongs. The numbers denote the nodes connected by the link. Although these links are also used in a "reverse" direction (e.g. node N1A to N0A), they will continue to be referred to by the "forward" references to the physical links $L_R01A$, $L_R12A$ etc. Similarly, the links in ring B are labelled in the forwards direction. In addition, each node is connected to the other member node of its clique by a pair of bi-directional links labelled LnA and LnB respectively. Once again, note that this labelling does not imply any particular directionality of movement of data over the links, but is a reference to the physical link itself for ease of explanation.

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in British applications with publication numbers GB2569843; GB2569430; GB2569275; the contents of which are herein incorporated by reference. However, the techniques described herein may be used on any type of processor constituting the nodes. What is outlined herein is a topology and method of exchanging data in an efficient manner to implement a particular exchange pattern which is useful in machine learning models. Furthermore, the links could be manifest in any suitable way, subject only to the criteria that they are bi-directional. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

While in theory the links could be deactivated to consume effectively no power, in practice the activation time and non-deterministic nature of machine learning applications generally prohibit dynamic activation during program execution. As a consequence, the present inventor has determined that it is better to make use of the fact that the chip to chip link power consumption is essentially constant for any particular configuration, and that therefore the best optimisation is to maximise the use of the physical links by maintaining chip to chip traffic concurrent with IPU activity as far as is possible.

SERDES PHYs are full duplex (that is a 16 Gbit per second PHY supports 16 Gbits per second in each direction simultaneously), so full link bandwidth utilisation implies balanced bi-directional traffic. Moreover, note that there is significant advantage in using direct chip to chip communication as compared with indirect communication such as via switches. Direct chip to chip communication is much more power efficient than switched communication.

Another factor to be taken into consideration is the bandwidth requirement between nodes. An aim is to have sufficient bandwidth to conceal inter node communication behind the computations carried out at each node for distributed machine learning.

When optimising a machine architecture for machine learning, the Allreduce collective may be used as a yardstick for the required bandwidth. An example of the Allreduce collective has been given above in the handling of parameter updating for model averaging. Other examples include gradient averaging and computing norms.

As one example, the Allreduce requirements of a residual learning network may be considered.

A residual learning network is a class of deep convolutional neural network. In a deep convolutional neural network, multiple layers are utilised to learn respective features within each layer. In residual learning, residuals may be learnt instead of features. A particular residual learning network known as ResNet implements direct connections between different layers of the network. It has been demonstrated that training such residual networks may be easier in some contexts than conventional deep convolutional neural networks.

ResNet 50 is a 50 layer residual network. ResNet 50 has 25 M weights so Allreduce of all weight gradients in single position floating point format F16 involves partials of 50 megabytes. It is assumed for the sake of exemplifying the bandwidth requirement that one full Allreduce is required per full batch. This is likely to be (but does not need to be) an Allreduce of gradients. To achieve this, each node must output 100 megabits per Allreduce. ResNet 50 requires 250 gigaflops per image for training. If the sub-batch size per processing node is 16 images, each processor executes 400 gigaflops for each Allreduce collective. If a processor achieves 100 teraflops per second, it requires around 25 gigabits per second between all links to sustain concurrency of compute with Allreduce communication. With a sub-batch per processor of 8 images, the required bandwidth nominally doubles, mitigated in part by lower achievable teraflops per second to process the smaller batch.

Implementation of an Allreduce collective between p processors, each starting with a partial of size m megabytes (equal to the reduction size) requires that at least 2 m.(p-1) megabytes are sent over links. So the asymptotic minimum reduction time is 2 m.(p-1).(p-1) over (p.1) if each processor has 1 links it can send over simultaneously.

The present disclosure sets out an architecture and algorithm which attain this optimum.

Figure 4A:
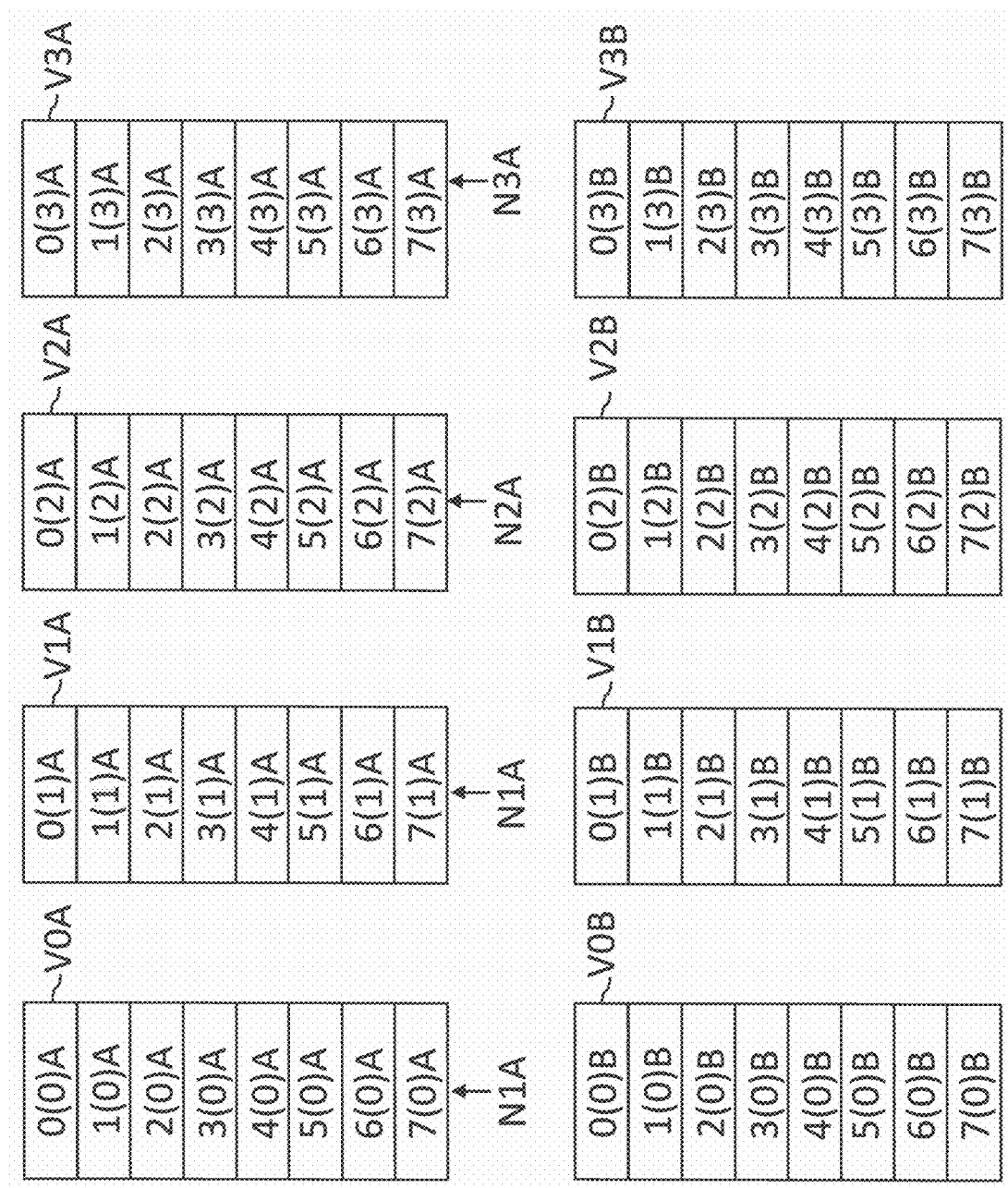
FIGS. 4A to 4E illustrate steps in a reduce-scatter phase implemented on a ring of cliques.
Figure 4B:
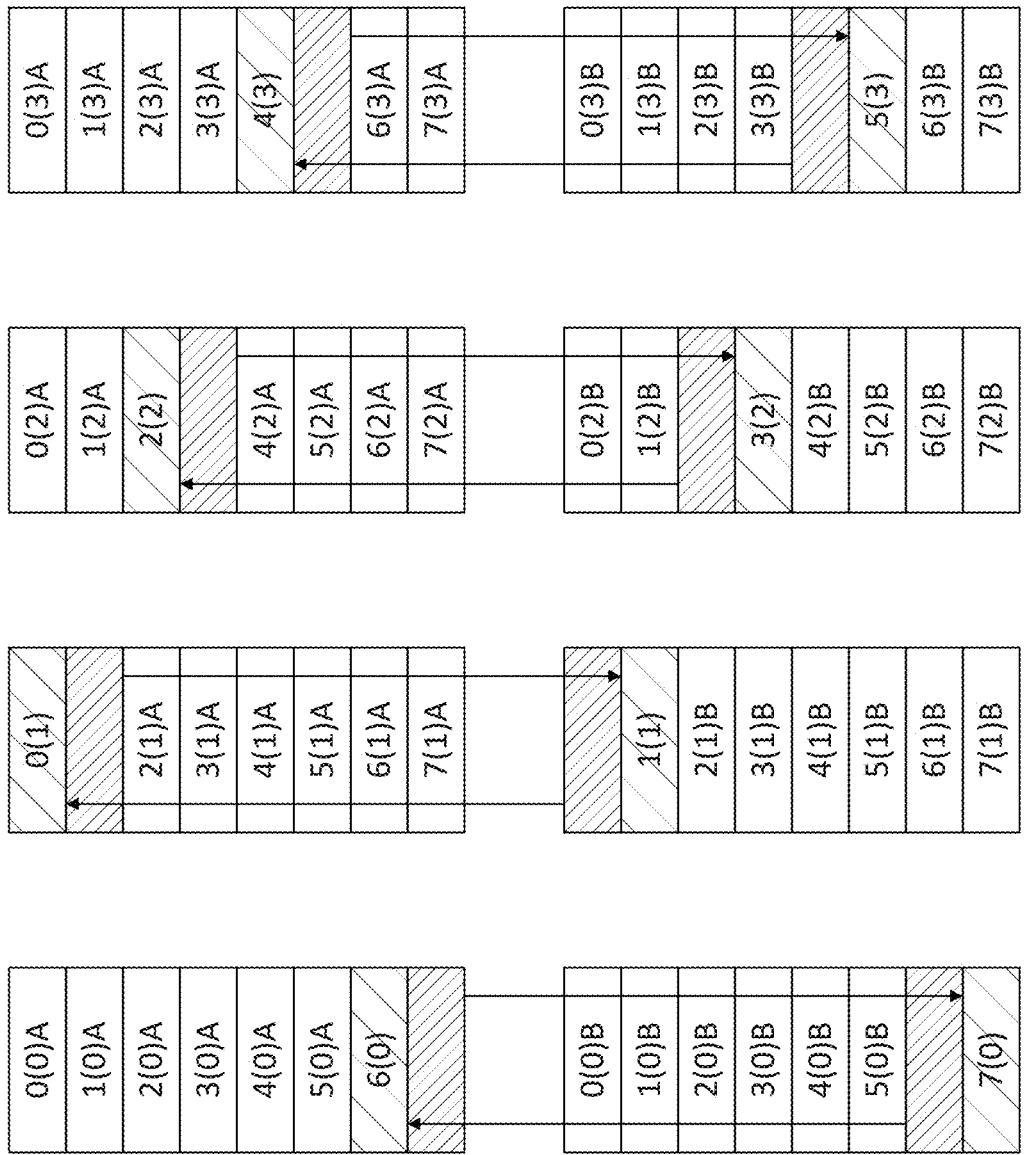

FIG. 4A shows the partial vectors on each node. For ease of explanation, FIG. 4A actually shows reduction of half the vector using one direction per link. Everything described in the following is being carried out for the other half of the vector in the opposite direction. Therefore, V0A, V1A, V2A, V3A and correspondingly, V0B, V1B, V2B and V3B actually denote half of the partial vector on each of the nodes. For reasons of clarity in the following description, however, each vector will be referred to as the vector (rather than the half vector). Each vector comprises a set of partial values, each partial a set of data values. For the sake of clarity, P's have been removed from each fragment, which are labelled as described above with reference to FIG. 2. In the following description, however, the letter P will be used where fragments are described. For example, fragment P0(0)A denotes the first fragment in vector V0A, which is labelled in the drawing 0(0)A. FIG. 4A shows a starting state for the Allreduce process. At this point, each node has performed computations on incoming data (such as described with reference to FIG. 1) and is ready to share the results, e.g. the delta weights from a training pass. FIG. 4B is the first step of the reduce-scatter phase of the Allreduce process. In the first step, each node exchanges a partial value (fragment) with the other member of its clique. As mentioned already, the present example has two members per clique, but in a situation where a clique had more members, in this first step, the partial value would be shared with all members of a clique. FIG. 4B shows nodes N0A and N0B sharing and reducing their partial values P6(0)A/6(0)B and P7(0)A/P7(0)B. The arrows in FIG. 4B represent exchange over the links L shown in FIG. 3. Each link is bi-directional; the behaviour of the reverse link is the same for the other vector values. That is, link L0A can transmit P6(0)A and receive a partial from the other half vector at the same time. When P6(0)B is received at node N0A, it is reduced with P6(0)A and stored as the partial reduction 6(0). Similarly, P7(0)A is reduced with P7(0)B at node N. The results are P7(0) at N0B and P6(0) at N0A. Similarly, the second clique of nodes N1A, N1B shares and reduces partials P0(1), A and P0(1)B, the nodes of the third clique N2A/N2B share P2(2)A/B and P3(2)A/B and the nodes N3A/N3B of the fourth clique share and reduce P4(3)A/B and P5(3)A/B.

Figure 4C:
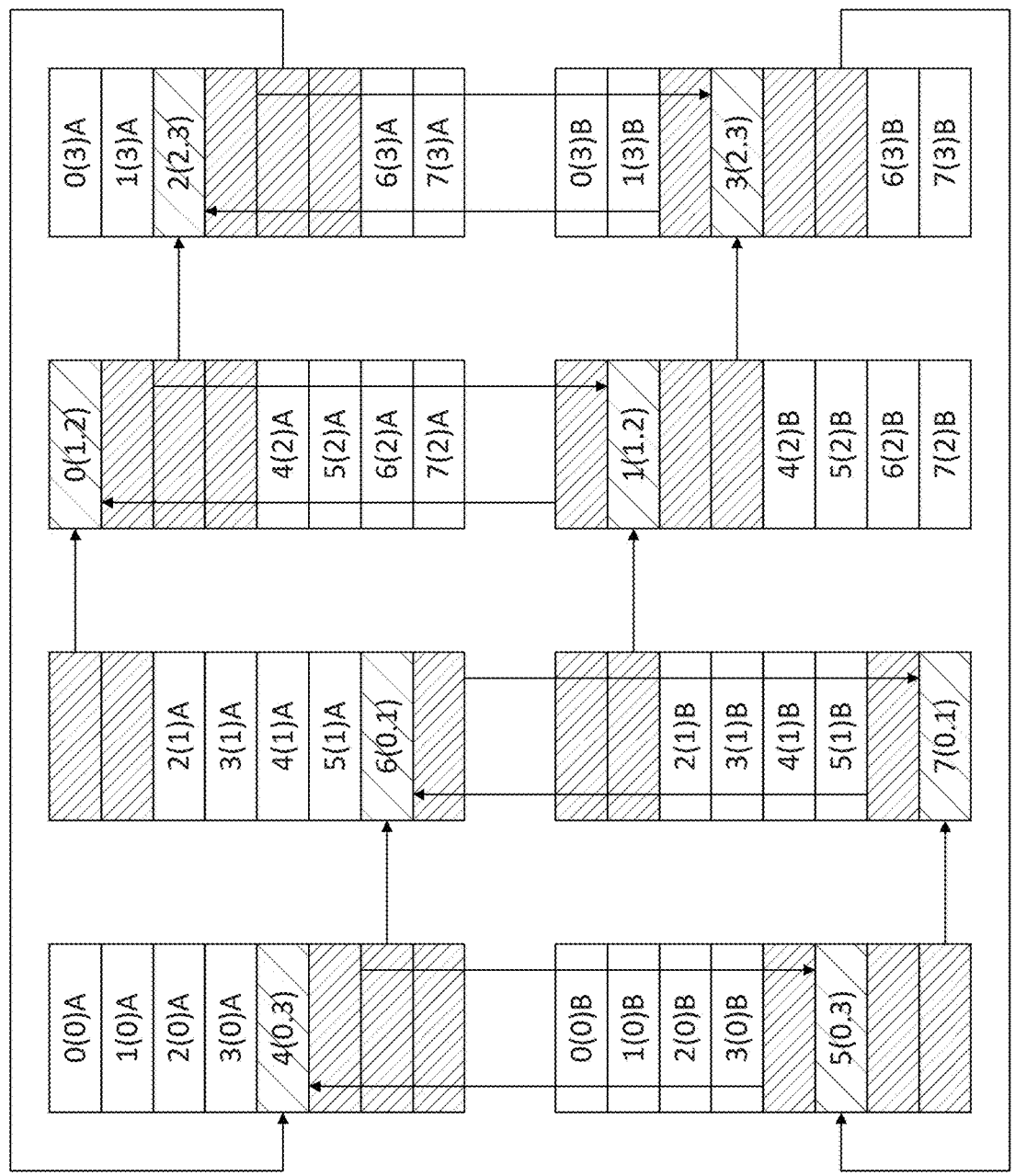

FIG. 4C illustrates the next exchange step. In this step, each of the shared and reduced partial values in the preceding step are exchanged between cliques using the ring links. For example, node N0A shares partial result 6(0) to node N1A. Similarly, node N1A shares partial result 0(1) to node N2A, and so on around ring A. A similar process occurs around ring B. Note that rings A and B, however, share alternate partially reduced values. That is, ring A shares 0, 2, 4 and 6 while ring B shares 1, 3, 5 and 7. In addition to operation of their ring links, each node operates its clique links to share another set of partial values which was not shared in the first step shown in FIG. 4B. For example, nodes and N0A and N0B share and reduce partials 4(0)A/4(0)B onto N0A and 5(0)B/5(0)A onto N0B. Note that simultaneous reductions may be carried out here. As an example, 4(0)A is being reduced with node 4(0)B over the clique link, but also 4(0)B is being reduced with the shared and reduced partial result 4(3) from clique 3. This could be done as two separate reductions of two values but there can be occurring advantages if they are carried out as a simultaneous reduction of three values.

Figure 4D:
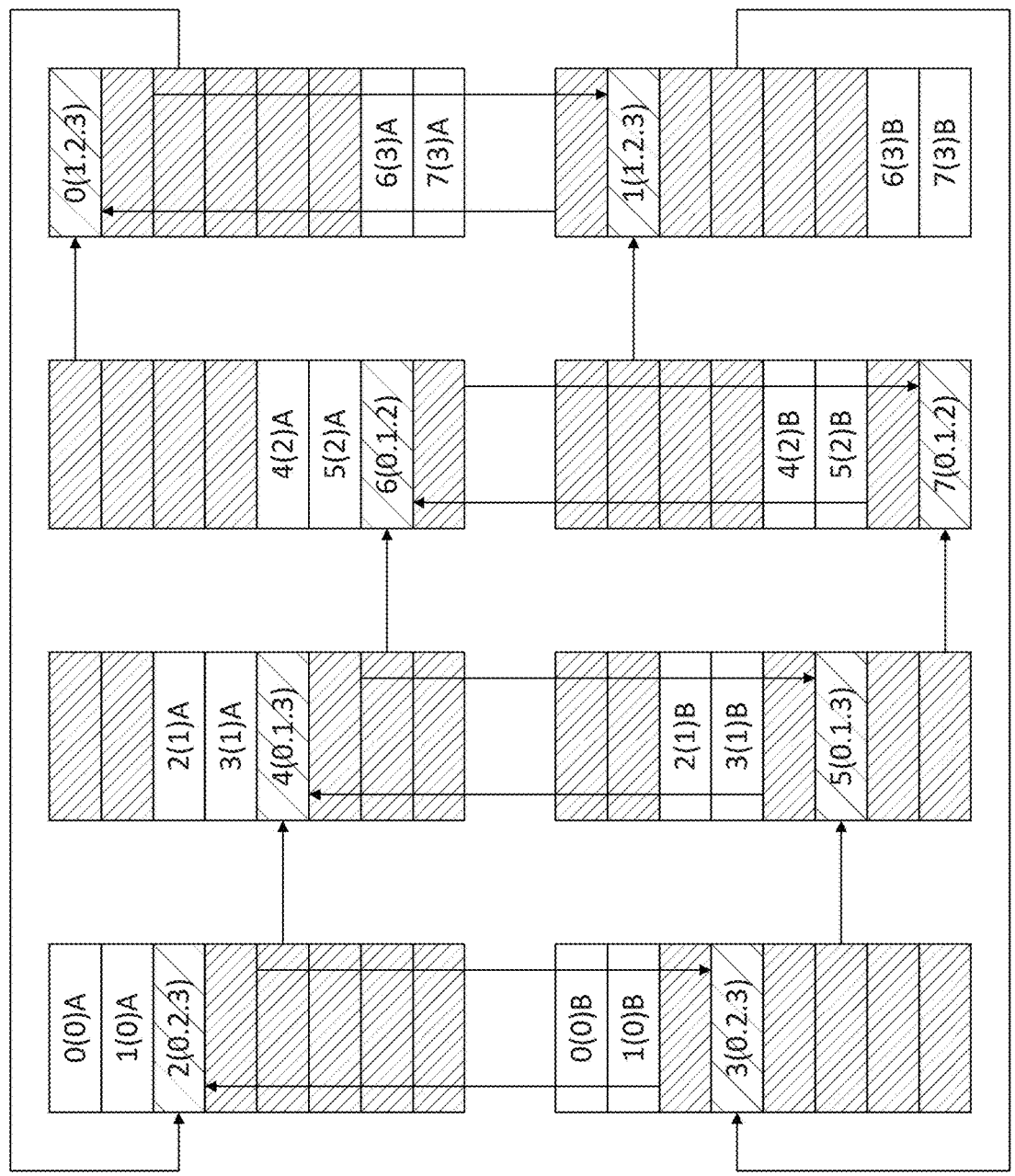
Figure 4E:
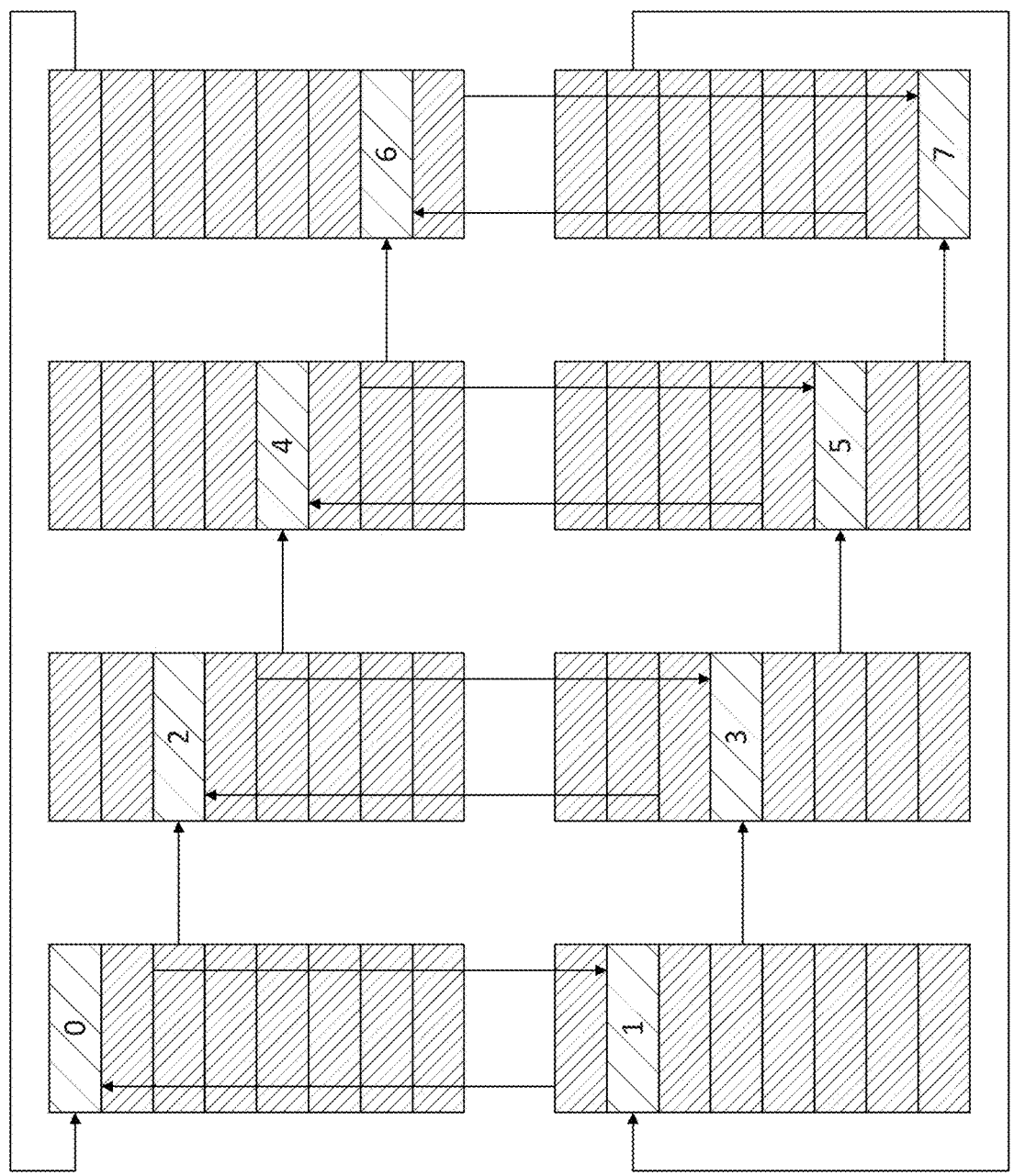

In the next step shown in FIG. 4D, once again both the ring links and clique links are used to transmit values. Each node is working around its partial vector. That is, nodes Nn0 are now sharing and reducing partials 2(0)A/B on the clique links. Furthermore, on the ring links, the next set of reduced partials is being shared around the ring. So, for example, looking at node N1B, this is transmitting to node N2B the partial reduction P7(0,1) so that it can be reduced with 7(2) to achieve the partial 7(0, 1, 2). In the final step of the reduce-scatter process, the clique links transfer the final partial values of their respective vectors to the other member of their clique, and the ring links transfer each reduction one further step around such that it can be finally reduced. Therefore, as shown in FIG. 4E, each node carries one fully reduced result of the vector. The nodes in ring A carry reductions 0, 2, 4 and 6, and the nodes in ring B carry reductions 1, 3, 5 and 7.

Figure 5A:
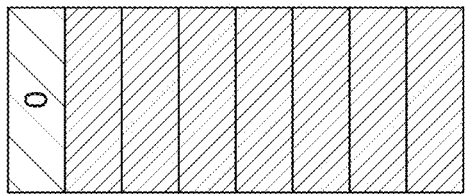
FIG. 5A to 5E illustrate steps in an Allgather phase implemented on a ring of cliques.
Figure 5A:
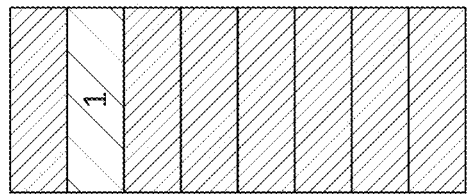
Figure 5A:
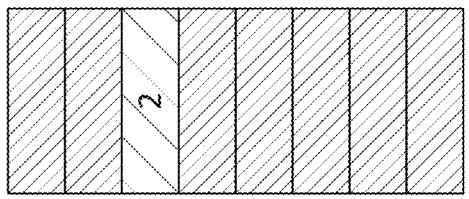
Figure 5A:
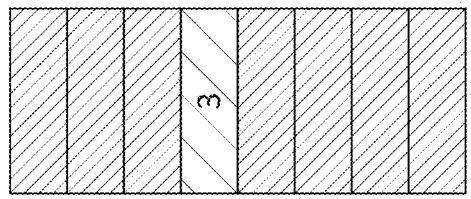
Figure 5A:
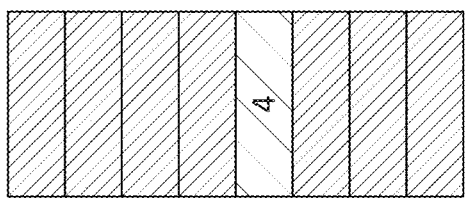
Figure 5A:
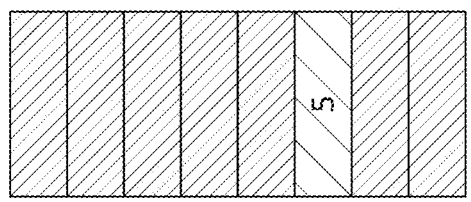
Figure 5A:
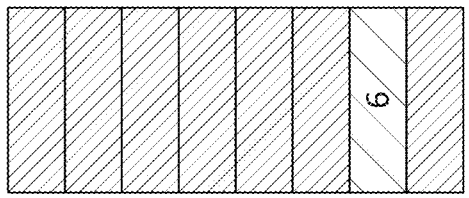
Figure 5A:
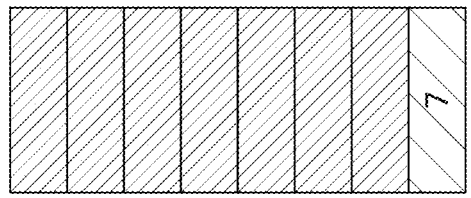

Reference will now be made to FIGS. 5A to 5D to describe the next phase, which is four Allgather steps. The starting state for the process is shown in FIG. 5A which is the state following the step of FIG. 4E after the reductions have been carried out on the individually transmitted partials.

Figure 5B:
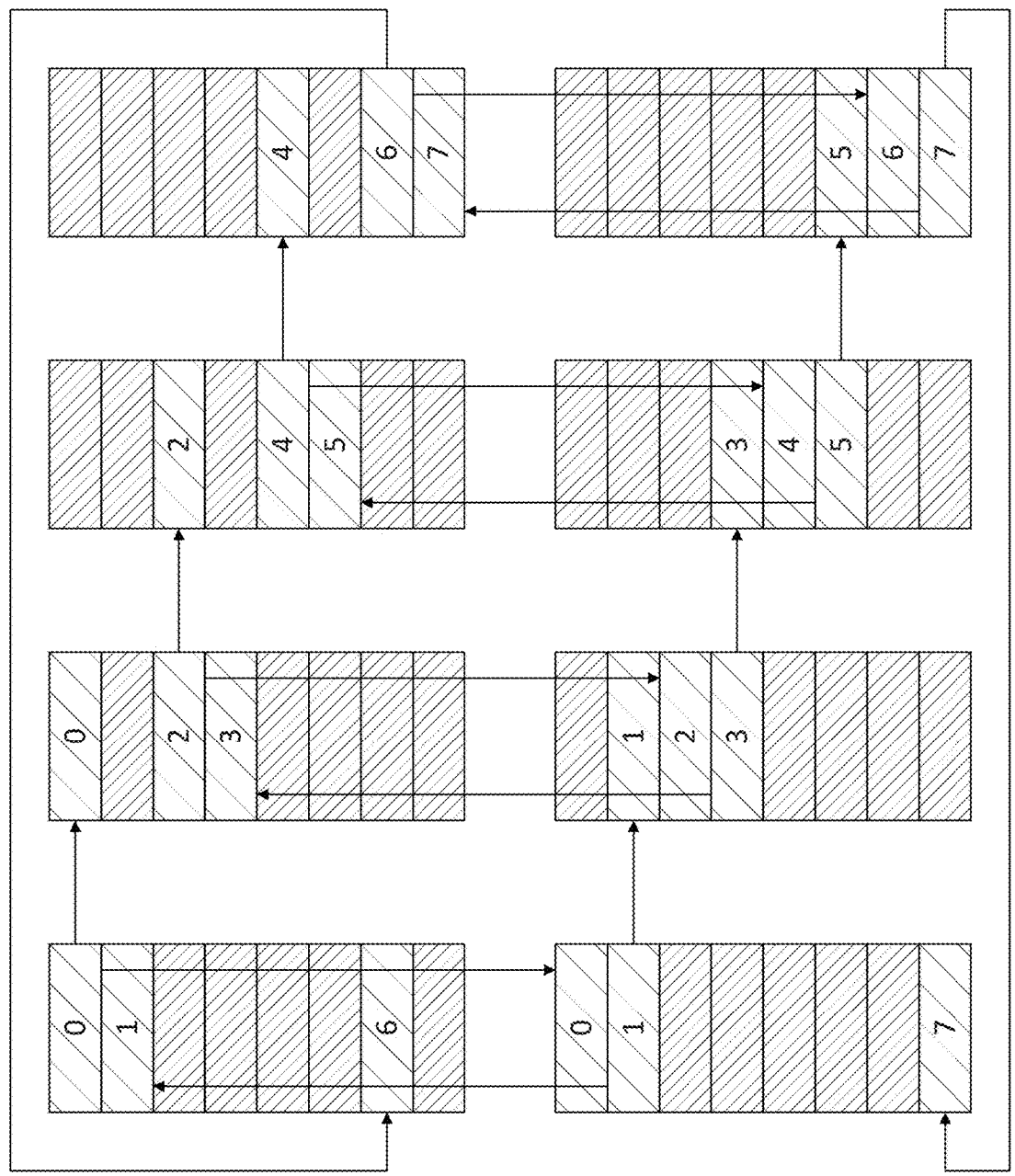

FIG. 5B shows the first exchange step in the Allgather process. In this step, the ring links and the clique links are all operating. The clique links transmit respective reductions to their neighbour. For example, nodes N0A/N0B exchange reductions r0, r1. The ring links transmit reductions to the next neighbours in the ring. For example, node N0A shares reduction r0 with node N1A. Once again, even reductions are shared around ring A, and odd reductions are shared around ring B. Node that in FIGS. 5A to 5E, the denotation r has been removed from the Figure for reasons of clarity. That is, e.g. r0 denotes a reduction result which is simply labelled 0 in the figures.

Figure 5C:
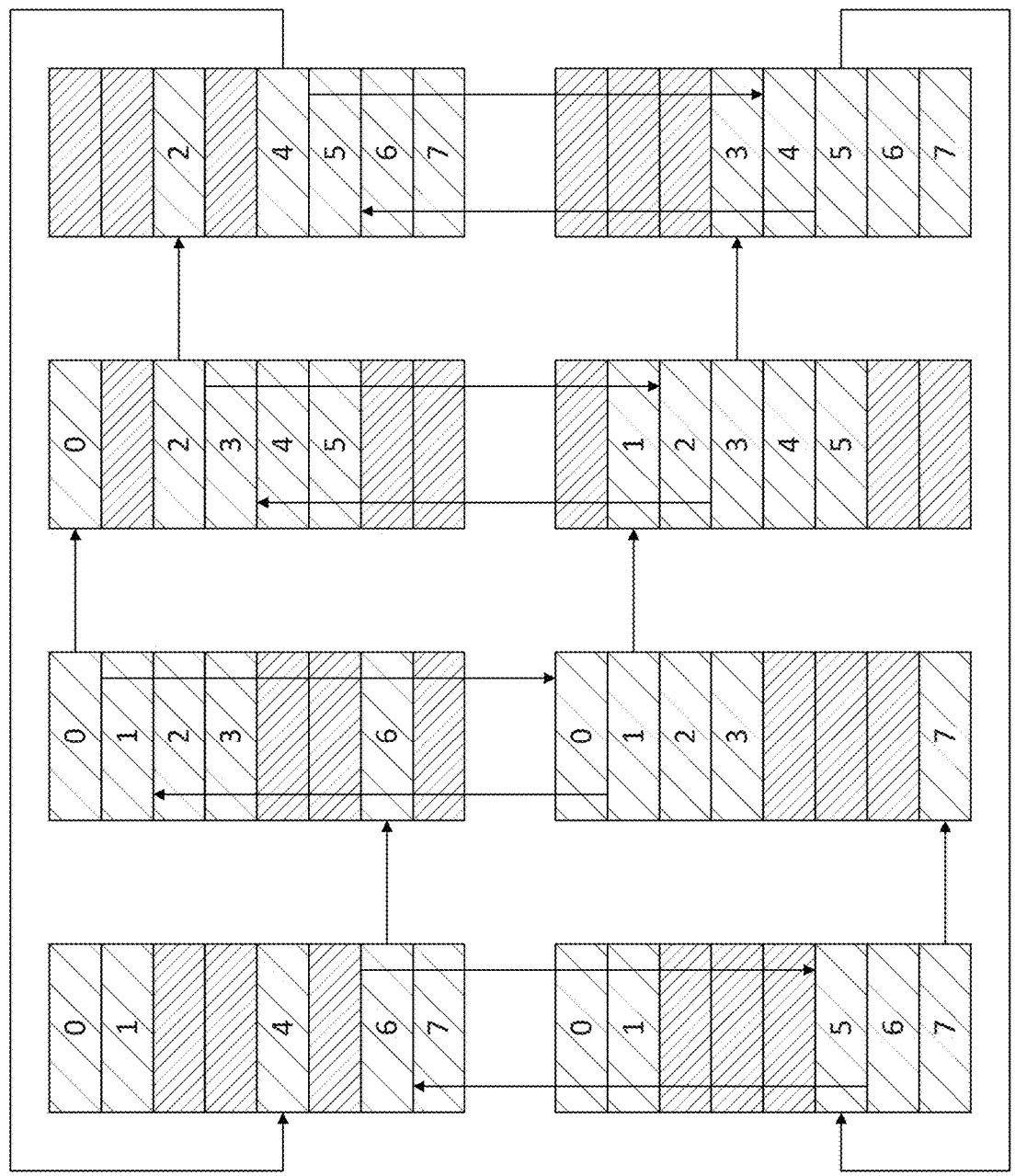
Figure 5D:
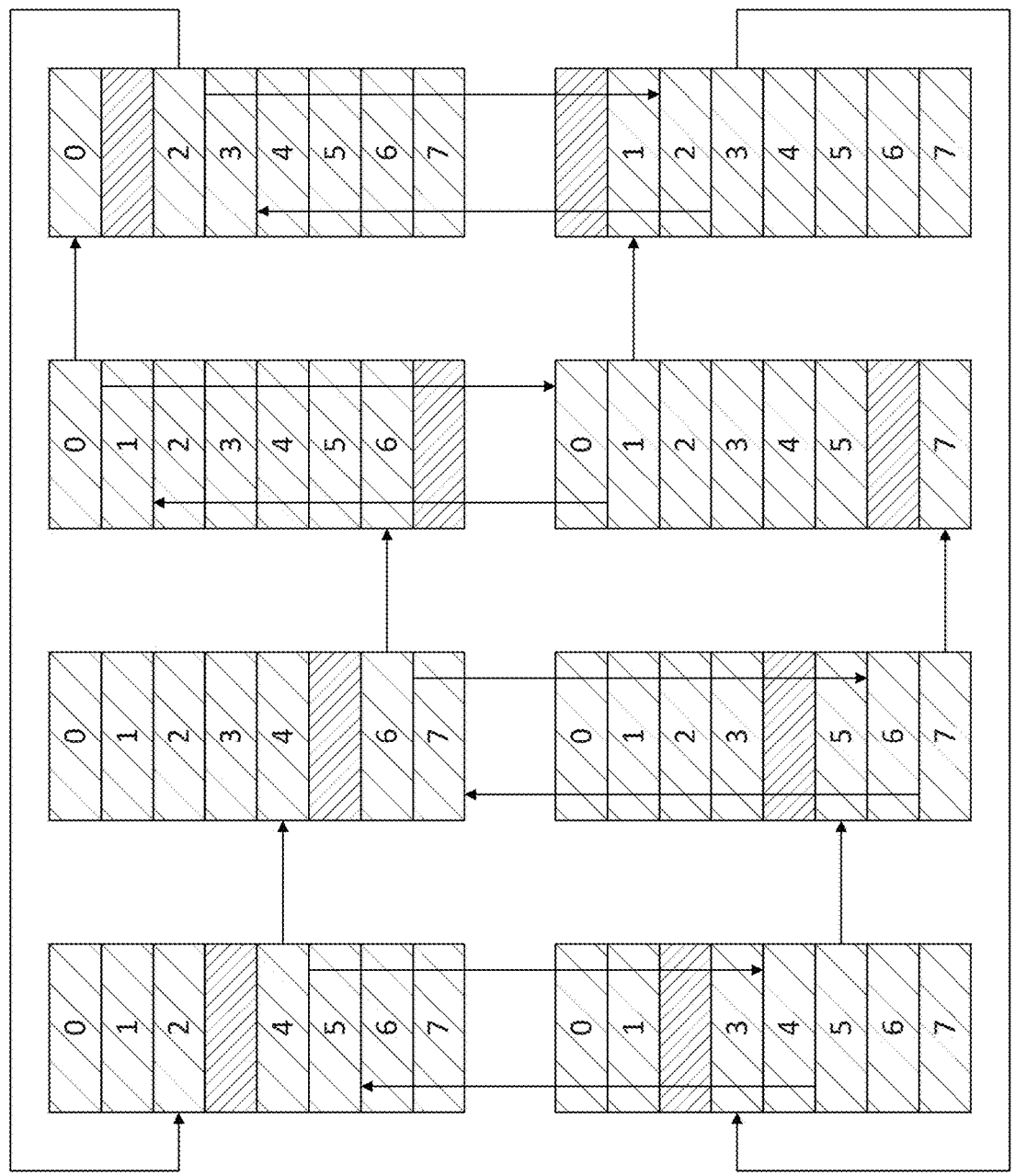
Figure 5E:
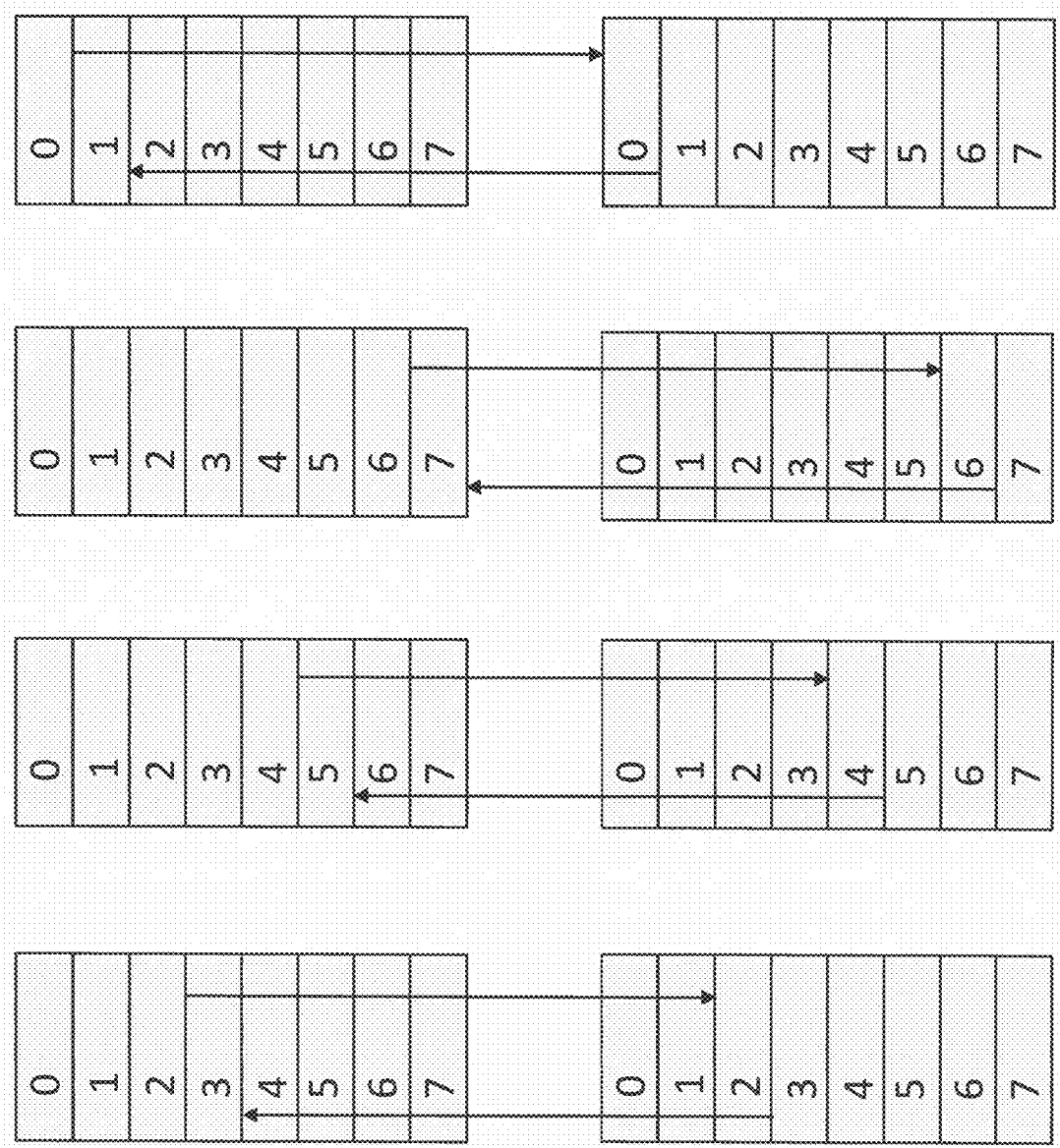

FIG. 5C shows the next step in the Allgather process. According to this step, all clique links and all ring links are operative to exchange data. Each node shares a reduction around the ring, and with its clique member. In FIG. 5D similarly, the ring links and clique links are all operating. In the final step, there is one last reduction to be shared between clique members and this is carried out using the clique links. For example in the case of clique members N0A, N0B they are sharing reductions r2, r3.

Figure 6:
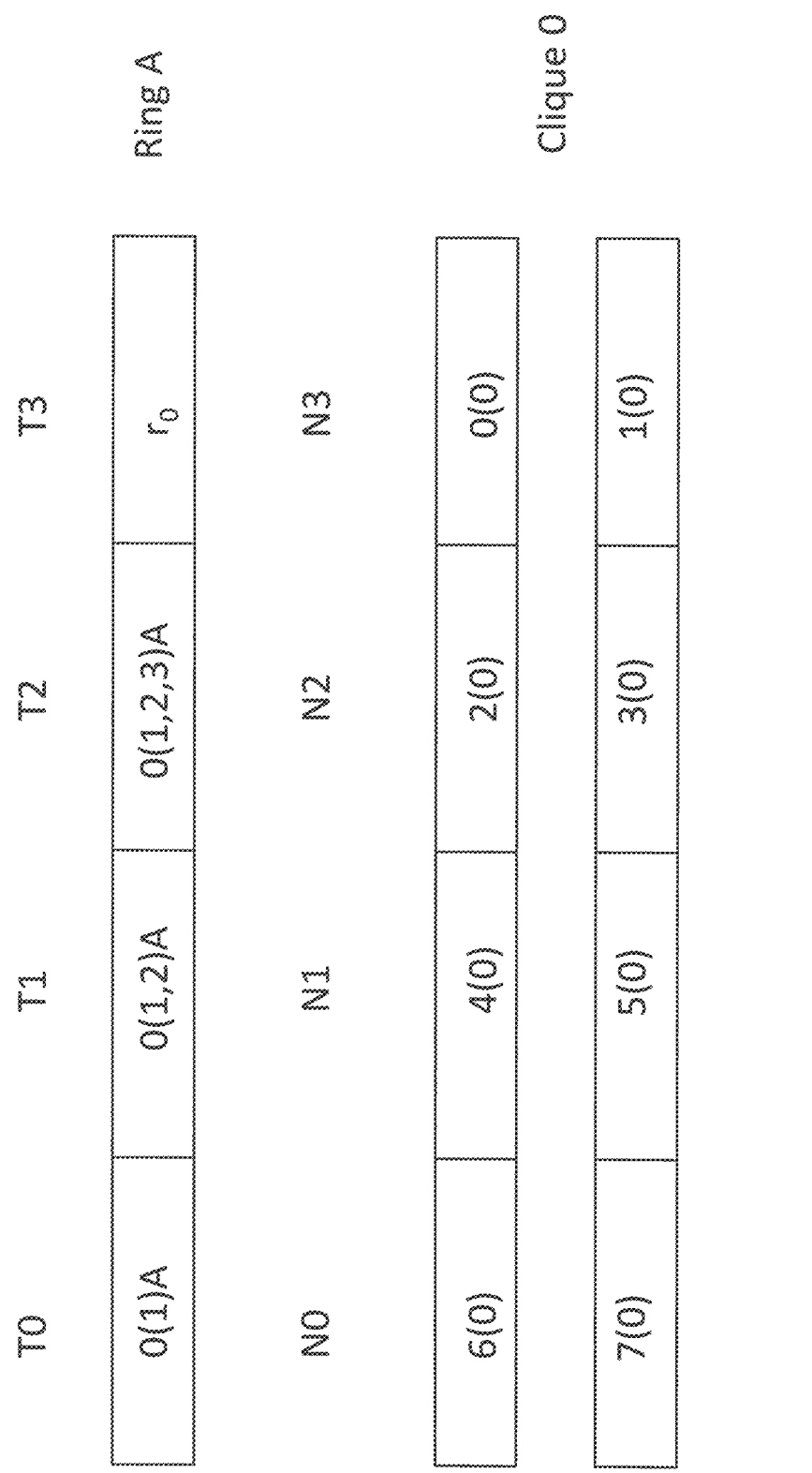
FIG. 6 is a schematic diagram illustrating the storing of partials and reductions within a ring and within a clique.

FIG. 6 is a schematic diagram of the message exchange step so that the behaviour of the ring and the behaviour of the cliques can be more readily understood. As can be seen from FIG. 6, it is the exchange of data around the ring which enables the partials to be accumulated into reductions across the nodes. The clique members, however, act to exchange partials within their own cliques such that the ring links can operate at their most efficient. FIG. 6 shows the exchanges in ring A for times T0, T1, T2 and T3 where these times each represent the time taken for one step of exchange. FIG. 6 also illustrates the clique exchanges for the members of clique 0 at similar times.

Figure 7:
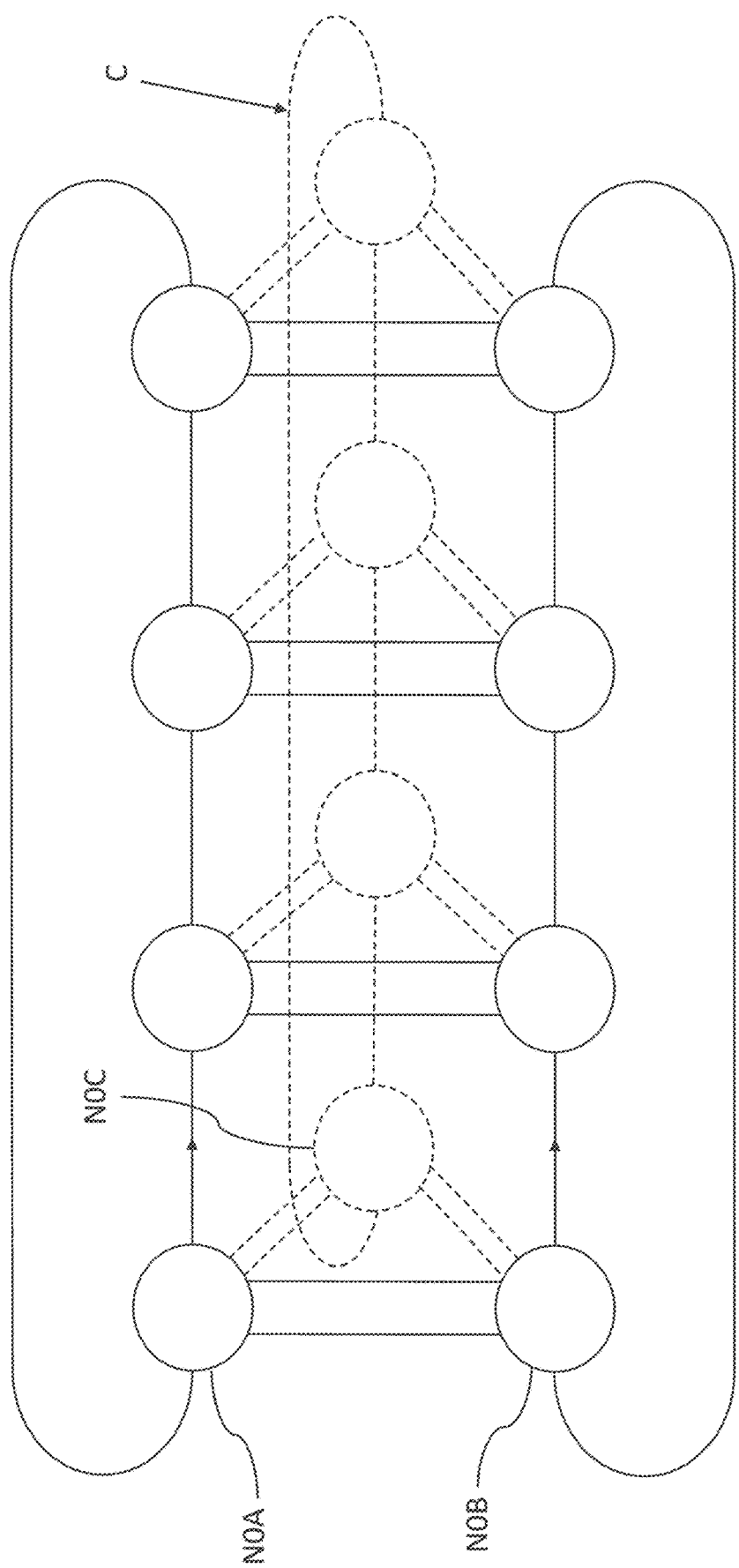
FIG. 7 is a schematic block diagram of a ring of cliques, where each clique has three members.

The above example is a ring of cliques, where each clique has two member nodes. FIG. 7 shows an architecture in which each clique has three member nodes N0A, N0B, N0C etc. The "C" nodes are connected in a third ring C.

The links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre soldered between chips on a printed circuit board.

The concepts and techniques described herein are particularly useful because they enable optimum use to be made of non-switchable links. A configuration may be built by connecting up the processing nodes as described herein using the fixed non switchable links between the nodes.

In some embodiments, in order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have two or three active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will be readily be appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing node performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the all reduced collective. In this way, the compiler has precompiled node level programs which control the links over which the partial vectors are transmitted (or respective fragments of the partial vectors are transmitted).

It will readily be apparent that other synchronisation protocols may be utilised.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer comprising a plurality of processing nodes, each processing nodes having at least one processor configured to process input data to generate output data in the form of an array of data items; the plurality of processing nodes arranged in cliques in which each processing node of a clique is connected to each other processing node in the clique by first and second clique links, the cliques being inter-connected in rings such that each processing node is a member of a single clique and a single ring, the processing nodes being configured to exchange data items in respective exchange steps of a machine learning collective, wherein the processing nodes of all cliques are configured to exchange in each exchange step via the respective first and second clique links at least two data items with the other processing node(s) in its clique, and all processing nodes are configured to reduce each received data item with the data item in the corresponding position in the array on that processing node, wherein the machine learning collective is an Allreduce collective and each processing node is configured to exchange data items in exchange steps of an Allgather phase, following a reduce-scatter phase of the Allreduce collective, wherein in each step of the Allgather phase reduced data items are exchanged between processing nodes in a clique, and wherein the processing nodes are each configured to transmit data items in a forwards direction to its adjacent processing node in the ring in at least some of the exchange steps in the reduce-scatter phase.

2. The computer according to claim 1, wherein each processing node comprises memory configured to store an array of data items ready to be exchanged in the reduce-scatter phase, wherein each data item is respectively positioned in the array with corresponding data items being respectively positioned at corresponding locations in the arrays of other processing nodes.

3. The computer according to claim 1, wherein the processing nodes are configured to transmit data items to their forwards adjacent processing node in the ring for all exchange steps of the reduce-scatter phase apart from a first step, in which no data items are transmitted between processing nodes connected in a ring.

4. The computer according to claim 1, wherein the array at each processing node comprises two sub arrays and processing nodes are inter-connected by bi-directional links, wherein in each exchange step of the reduce-scatter phase, all processing nodes are configured to exchange with the other processing node(s) of their clique, two data items from one sub array and two further data items from the other sub array wherein the two data items and the further two data items are exchanged over the same bi-directional link in opposite directions.

5. The computer according to claim 4, wherein the processing nodes are each configured to transmit data items in a forwards direction to its adjacent processing node in the ring in at least some of the exchange steps in the reduce-scatter phase and wherein in at least some exchange steps of the reduce-scatter phase each processing node is configured to transmit data items to its adjacent backwards processing node in the ring, wherein the transmission in each of the forwards and backwards direction from each processing node is carried out on the same bi-directional link.

6. The computer according to claim 2, wherein each array represents at least part of a vector of partial deltas, each partial delta representing an adjustment to a value stored at each processing node.

7. The computer according to claim 6, wherein each processing node is configured to generate the vector of partial deltas in a compute step.

8. The computer according to claim 7, wherein each processing node is configured to divide the vector into two sub arrays for separate exchange and reduction in the reduce-scatter phase.

9. The computer according to claim 7, wherein each processing node is configured to generate the vector of partial deltas by carrying out a compute function on a set of values and a batch of incoming deltas, the partial deltas being the output of the compute function.

10. The computer according to claim 9, which is configured to implement a machine learning model wherein the incoming batch data is training data, and the values are weights of the machine learning model.

11. A method of operating a computer comprising a plurality of processing nodes, each processing node having at least one processor configured to process input data to generate output data in the form of an array of data items, the plurality of processing nodes arranged in cliques in which each processing node of a clique is connected to each other processing node in the clique by first and second clique links, the cliques being interconnected in rings such that each processing node is a member of a single clique and a single ring, the method comprising exchanging data item in respect of exchange steps of a first phase of a machine learning collective, wherein in each exchange step the processing nodes of all cliques exchange via the respective first and second clique links at least two data items with the other processing nodes in its clique, and all processing nodes reduce each received data item with the data item in the corresponding position in the array on that processing node, wherein the machine learning collective is an Allreduce collective and each processing node exchanges data items in exchange steps of an Allgather phase, following a reduce-scatter phase of the Allreduce collective, wherein in each step of the Allgather phase reduced data items are exchanged between processing nodes in a clique, and wherein each processing node transmits data items in a forwards direction to its adjacent processing node in the ring in at least some of the exchange steps in the reduce scatter phase.

12. The method according to claim 11, wherein each processing node comprises memory configured to store an array of data items ready to be exchanged in the reduce-scatter phase, wherein each data item is respectively positioned in the array with corresponding data items being respectively positioned at corresponding locations in the arrays of other processing nodes.

13. The method according to claim 11, wherein each processing node transmits data items to their forwards adjacent processing node in the ring for all exchange steps of the reduce-scatter phase apart from a first step, in which no data items are transmitted between processing nodes connected in a ring.

14. The method according to claim 11, wherein the array at each processing node comprises two sub arrays and processing nodes are inter-connected by bi-directional links, wherein in each exchange step of the reduce-scatter phase, all processing nodes exchange with the other processing node(s) of their clique, two data items from one sub array and two further data items from the other sub array wherein the two data items and the further two data items are exchanged over the same bi-directional link in opposite directions.

15. The method according to claim 14, wherein each processing node transmits data items in a forwards direction to its adjacent processing node in the ring in at least some of the exchange steps in the reduce-scatter phase and wherein in at least some exchange steps of the reduce-scatter phase each processing node transmits data items to its adjacent backwards processing node in the ring, wherein the transmission in each of the forwards and backwards direction from each processing node is carried out on the same bi-directional link.

16. The method according to claim 12, wherein each array represents at least part of a vector of partial deltas, each partial delta representing an adjustment to a value stored at each processing node.

* * * * *